US012554332B2

(12) United States Patent
Ikemiya et al.

(10) Patent No.: US 12,554,332 B2
(45) Date of Patent: Feb. 17, 2026

(54) CONVERSION DEVICE, CONVERSION METHOD, AND CONVERSION PROGRAM

(71) Applicant: SONY GROUP CORPORATION, Tokyo (JP)

(72) Inventors: Yukara Ikemiya, Kanagara (JP); Ryo Yokoyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/841,803

(22) PCT Filed: Mar. 22, 2023

(86) PCT No.: PCT/JP2023/011325
§ 371 (c)(1),
(2) Date: Aug. 27, 2024

(87) PCT Pub. No.: WO2023/189973
PCT Pub. Date: Oct. 5, 2023

(65) Prior Publication Data
US 2025/0165073 A1    May 22, 2025

(30) Foreign Application Priority Data
Mar. 31, 2022   (JP) ................................ 2022-059427

(51) Int. Cl.
*G06F 3/01*   (2006.01)
(52) U.S. Cl.
CPC .................... *G06F 3/016* (2013.01)

(58) Field of Classification Search
CPC ....................................................... G06F 3/016
See application file for complete search history.

(56) References Cited

U.S. PATENT DOCUMENTS 10,984,638 B1 *   4/2021   Meunier ................. G06F 3/016

FOREIGN PATENT DOCUMENTS

| CN | 109999488 A | 7/2019 |
|----|----|----|
| CN | 110568926 A | 12/2019 |
| JP | H0375694 U | 7/1991 |
| JP | 2019-219785 A | 12/2019 |
| WO | WO2019/138867 A1 | 7/2019 |

OTHER PUBLICATIONS

Search Report issued in International Patent Application No. PCT/JP2023/011325, mailed Jun. 13, 2023 and English translation of same. 5 pages.

* cited by examiner

*Primary Examiner* — Roy P Rabindranath
(74) *Attorney, Agent, or Firm* — K&L Gates LLP

(57) ABSTRACT

A conversion device (100) according to one aspect of the present disclosure includes: an acquisition unit (131) that acquires a conversion source signal to be a source of a haptic signal; and a conversion unit (132) that converts the conversion source signal acquired by the acquisition unit into an intermediate representation signal represented by at least one parameter. For example, the conversion unit separates the conversion source signal into elements constituting the conversion source signal, and converts the separated signal into the intermediate representation signal.

11 Claims, 27 Drawing Sheets

FIG.13
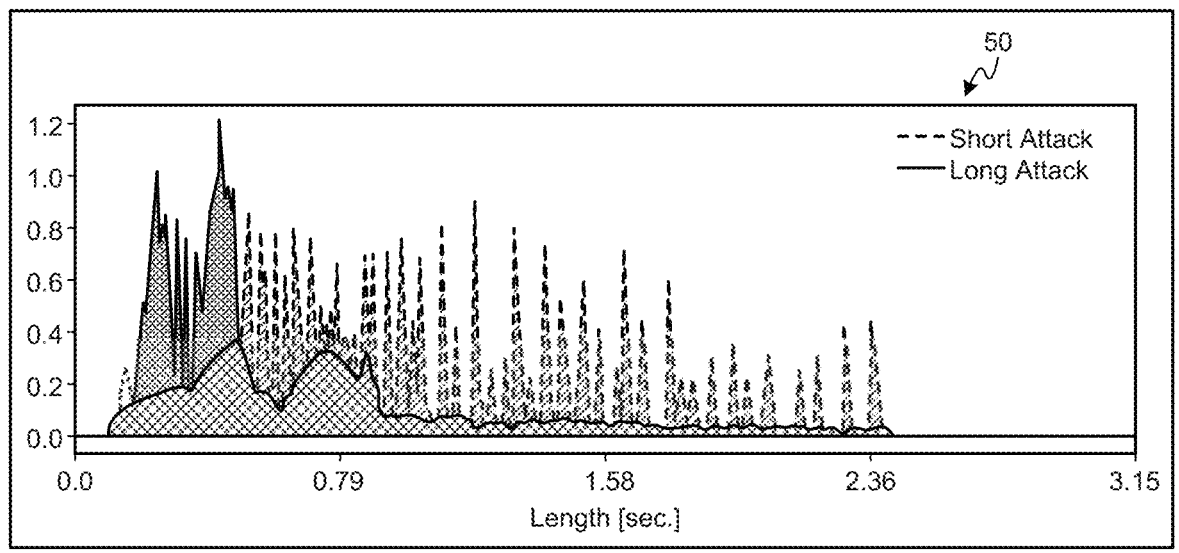
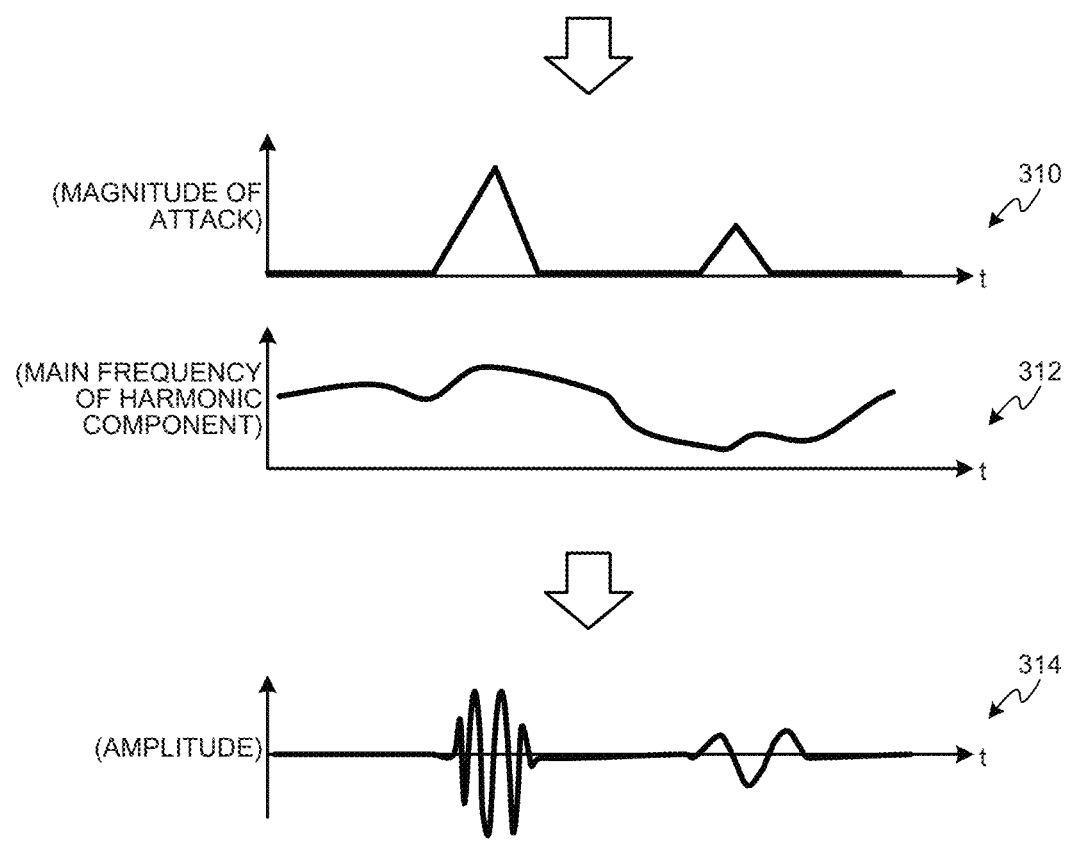

FIG.14
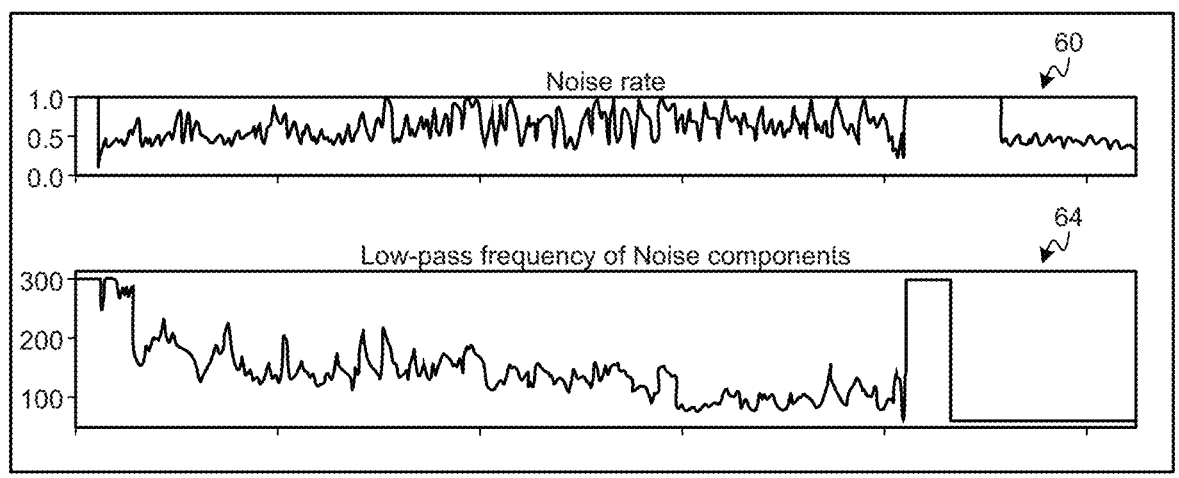
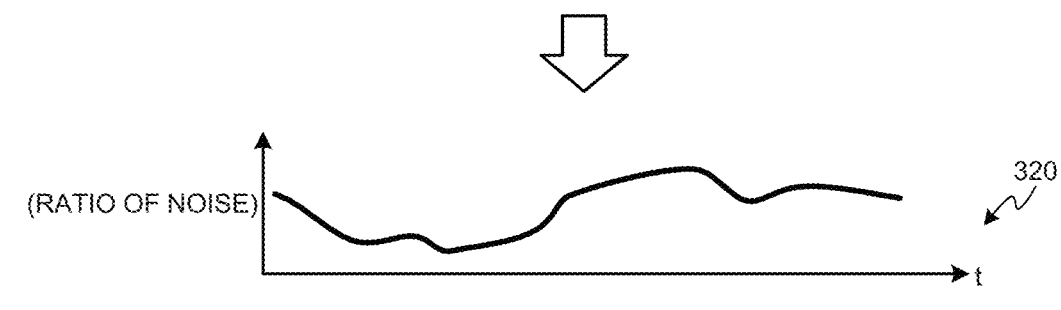
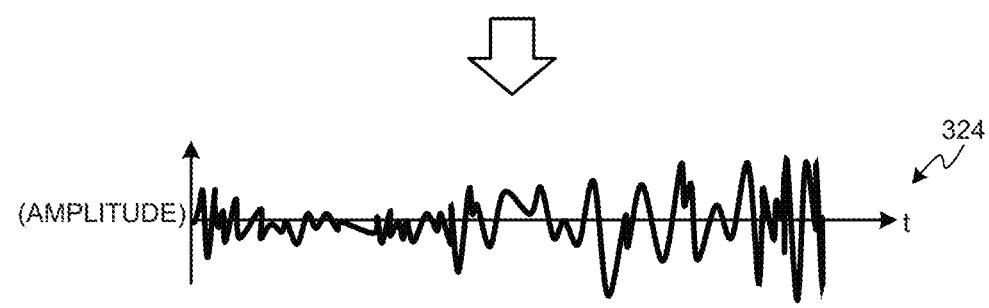

FIG.15
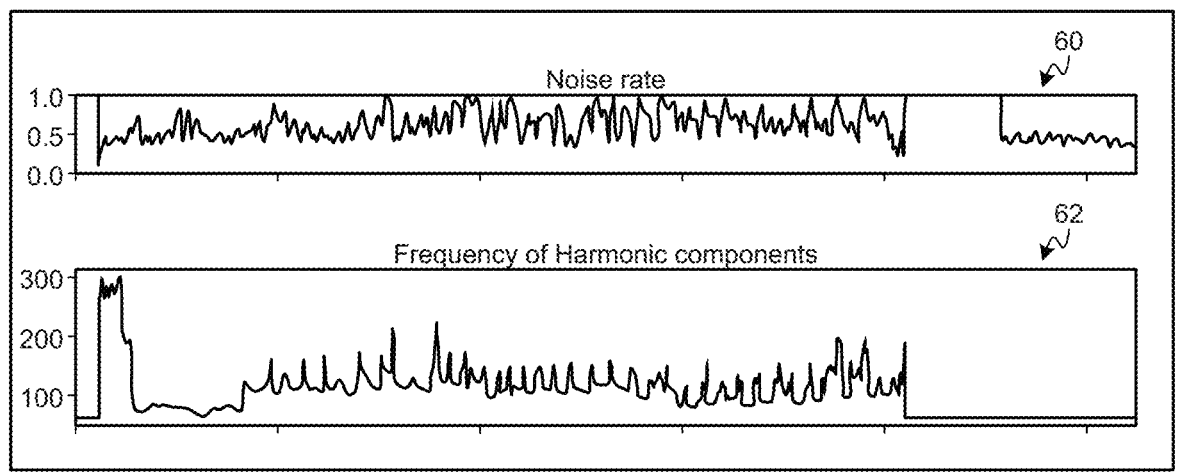
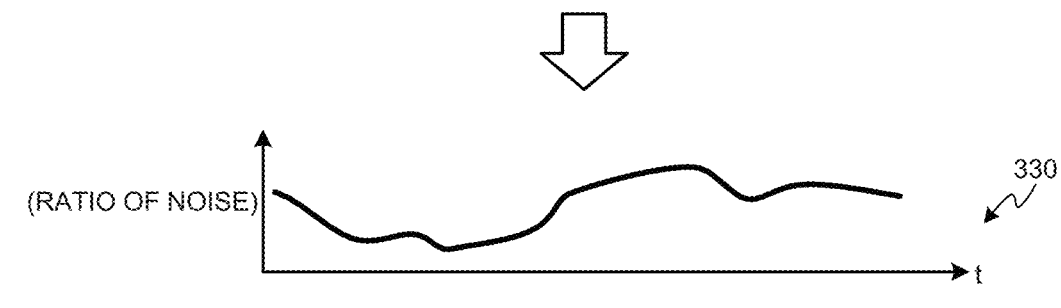
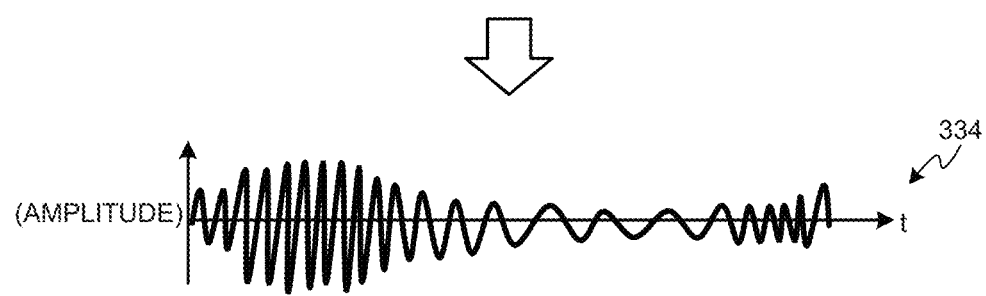

FIG.18
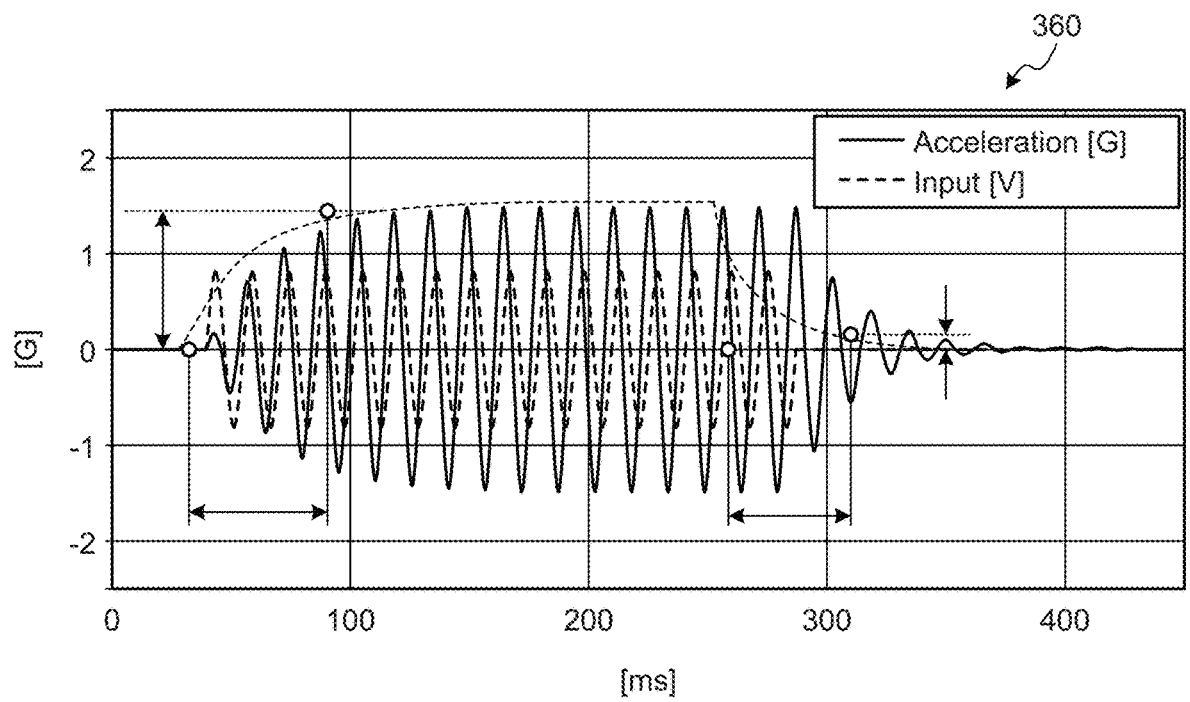
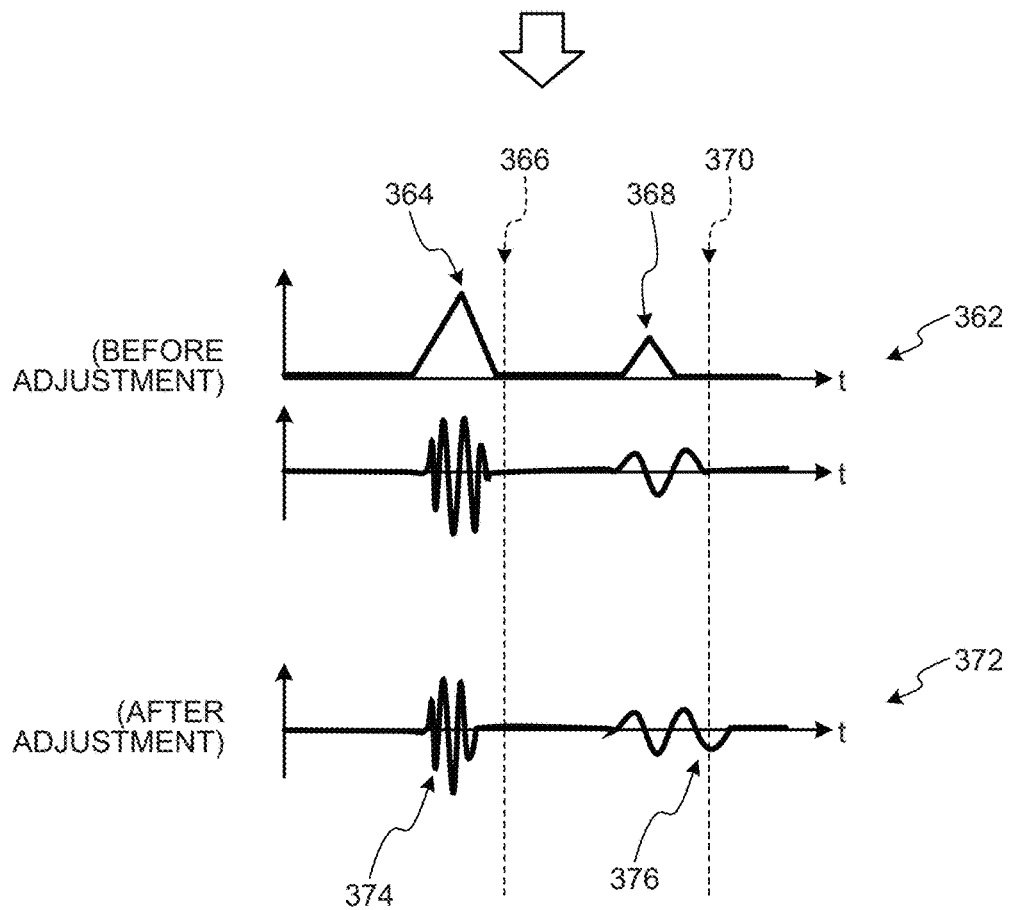

CONVERSION DEVICE, CONVERSION METHOD, AND CONVERSION PROGRAM

FIELD

The present disclosure relates to a conversion device, a conversion method, and a conversion program that perform signal conversion processing in a haptic technology.

BACKGROUND

There is known a haptic presentation (haptics) technology that enables a user to obtain a desired perceptual effect by performing haptic presentation by a vibration stimulus or the like.

For example, there is known a technique of controlling the timing of a plurality of haptic signals to allow the user to simultaneously perceive two or more perceptual effects (for example, Patent Literature 1). There is also a known technique of appropriately encoding a plurality of haptic signals (for example, Patent Literature 2).

CITATION LIST

Patent Literature

Patent Literature 1: WO 2019/138867 A
Patent Literature 2: JP 2019-219785 A

SUMMARY

Technical Problem

According to the known technology, a plurality of haptic signals can be appropriately presented to the user, making it possible to improve the haptic experience of the user.

Meanwhile, haptic presentation is easily affected by characteristics of a device that outputs a haptic signal or a vibrator (actuator) included in the device, and the like. Therefore, depending on the output device, it may be difficult to reflect the intention of the creator of the haptic signal. Furthermore, in order to precisely reflect the creator's own intention, it is necessary for the creator of the haptic signal to create the signal in consideration of the characteristics of the device to which the signal is to be output, increasing the work load on the creator.

In view of this, the present disclosure proposes a conversion device, a conversion method, and a conversion program capable of generating a haptic signal independent of an output environment.

Solution to Problem

A conversion device according to one embodiment of the present disclosure includes: an acquisition unit that acquires a conversion source signal to be a source of a haptic signal; and a conversion unit that converts the conversion source signal acquired by the acquisition unit into an intermediate representation signal represented by at least one parameter.

BRIEF DESCRIPTION OF DRAWINGS

FIG. 13 is a diagram (1) illustrating an example of decoding processing according to the embodiment.

FIG. 14 is a diagram (2) illustrating an example of decoding processing according to the embodiment.

FIG. 15 is a diagram (3) illustrating an example of decoding processing according to the embodiment.

FIG. 18 is a diagram (2) illustrating an example of adjustment processing based on characteristics of a haptic presentation device.

DESCRIPTION OF EMBODIMENTS

Figure 1:
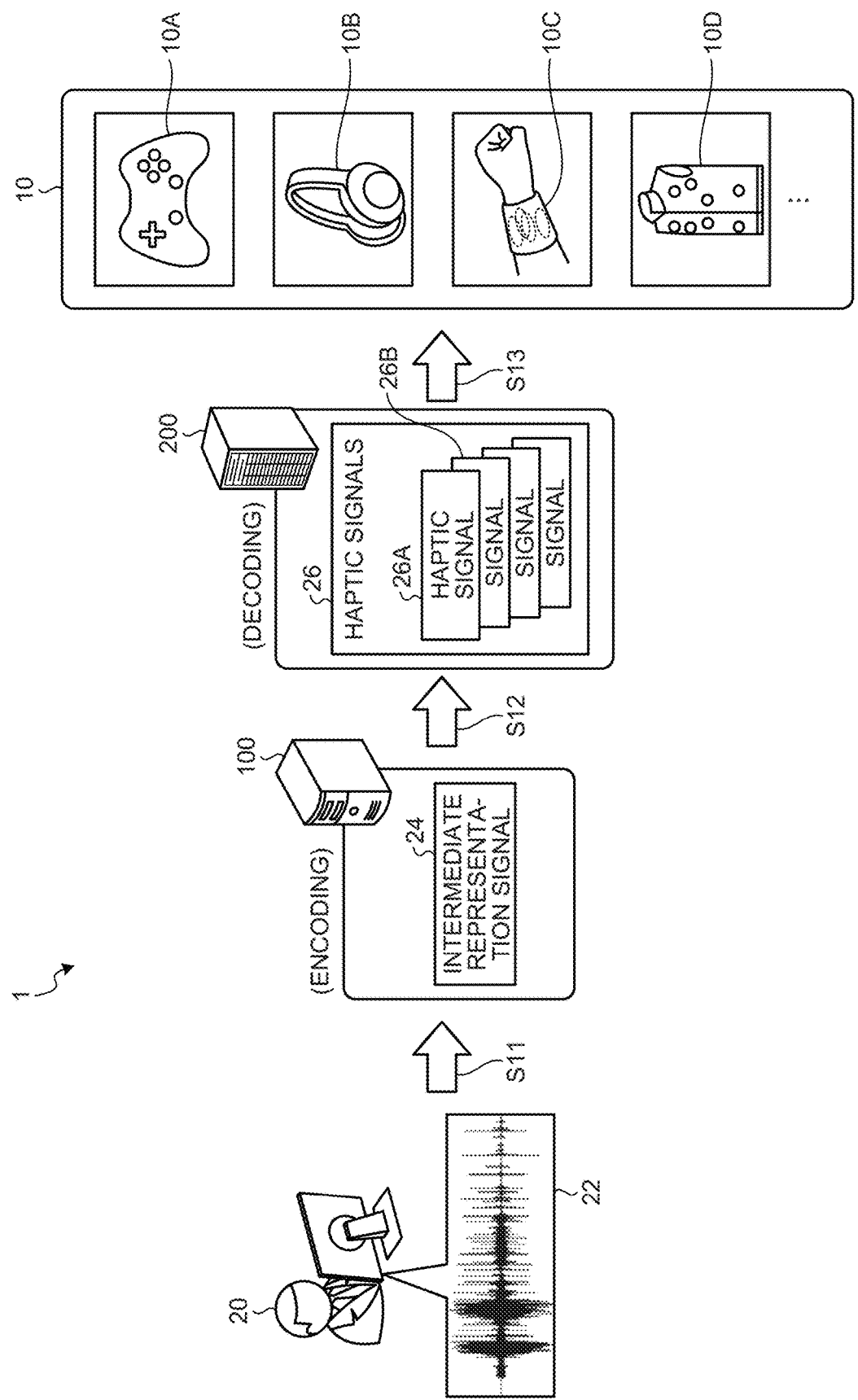
FIG. 1 is a diagram illustrating an outline of information processing according to an embodiment of the present disclosure.

Embodiments of the present disclosure will be described below in detail with reference to the drawings. In each of the following embodiments, the same parts are denoted by the same reference symbols, and a repetitive description thereof will be omitted.

The present disclosure will be described in the following order.

1. Embodiments
  1-1. Overview of information processing according to embodiment
  1-2. Configuration of conversion device according to embodiment
  1-3. Procedure of conversion processing according to embodiment
  1-4. Configuration of decoding device according to embodiment
  1-5. Procedure of decoding processing according to embodiment
2. Modification of embodiment
  2-1. Device configuration
3. Other embodiments
4. Effects of conversion device according to present disclosure
5. Effects of decoding device according to present disclosure
6. Hardware configuration 1. Embodiments (1-1. Overview of Information Processing According to embodiment)

First, an outline of information processing according to an embodiment will be described with reference to FIG. 1. FIG. 1 is a diagram illustrating an outline of information processing according to the embodiment.

FIG. 1 illustrates an information processing system 1 according to the embodiment. The information processing system 1 includes a conversion device 100, a decoding device 200, and a haptic presentation device 10. The information processing system 1 is a system that controls a series of processing for realizing haptic presentation intended by a creator 20 on the haptic presentation device 10.

The information processing according to the embodiment is executed by the conversion device 100 and the decoding device 200 illustrated in FIG. 1. Specifically, the conversion device 100 converts an arbitrary signal created by the creator 20 into an intermediate representation signal 24 for representing the signal independent of characteristics of the haptic presentation device 10 or the like. Furthermore, the decoding device 200 decodes the intermediate representation signal 24 into a signal to be output on various haptic presentation devices 10. That is, the conversion device 100 and the decoding device 200 play roles of an encoding function and a decoding function respectively in a series of haptic presentation processing. In the following description, a signal before undergoing processing by the conversion device 100 may be referred to as a "conversion source signal". Furthermore, in the following description, a haptic signal represents a signal having a waveform expressing vibration generated by vibration of an output unit (vibrator (actuator)) of the haptic presentation device 10. The haptic signal may be paraphrased as a command or a parameter supplied to the haptic presentation device 10 in order to realize vibration in the haptic presentation device 10.

The conversion device 100 illustrated in FIG. 1 is an information processing device that converts conversion source signals of various modes into the intermediate representation signal 24. For example, examples of the conversion device 100 include a personal computer (PC), a server device, and a tablet terminal. The conversion source signal is an arbitrary signal to be output as a haptic signal through the conversion processing according to the embodiment. Examples of the conversion source signal include: sound data in which a song, ambient sound, or the like is recorded; moving image data; and a haptic signal generated by a device other than the decoding device 200 and rendered for a specific type of the haptic presentation device 10.

The decoding device 200 is an information processing device that generates a haptic signal based on the intermediate representation signal 24. Examples of the decoding device 200 include a PC, a server device, and a tablet terminal.

The haptic presentation device 10 is an information processing device having a function of vibrating an output unit based on a haptic signal. Examples of the haptic presentation device 10 include a game controller 10A, headphones 10B, a wristband type device 10C, and a vest (suit) type device 10D. The haptic presentation device 10 includes one or more output units, and vibrates the output unit based on a haptic signal, thereby performing haptic presentation (giving a stimulus) to a corresponding physical part of the user. The output unit is an element that converts an electric signal into vibration, and corresponds to a device such as an eccentric motor, a linear vibrator, and a piezo element actuator, for example.

The user touching the haptic presentation device 10 can receive haptic presentation corresponding to the flow of the content such as video and audio displayed on the display or the like while enjoying the content, thereby being able to enjoy the content with a higher realistic feeling. Specifically, the user can enjoy haptic presentation synchronized with a lapse of time of presentation of the displayed content such as the moving image or the audio.

The creator 20 is a person who creates a piece of content or a signal for haptic presentation. For example, the creator 20 creates a piece of content such as a moving image or an audio. Alternatively, the creator 20 creates a signal (haptic signal) dedicated to haptic presentation in order to enhance the realistic feeling of the user. For example, in a case of performing haptic presentation by using the game controller 10A, the creator 20 sets a scene as a target of haptic presentation in a piece of game content, sets a degree of output (strength of vibration or frequency) to be used to express the scene, and designs a haptic signal to be actually output.

As described above, the haptic presentation technology is a useful technology capable of presenting information to the user through the haptic presentation device 10 or giving additional vibration to video and audio media, thereby allowing the user to have a higher realistic feeling. The haptic presentation technology is widely utilized in applications including entertainment applications in which the game controller 10A vibrates in conjunction with a game sound and a dedicated vibrating device vibrates in conjunction with music as a method of enjoying the music for the person with hearing difficulties, and applications of transmitting useful information to the user by using vibration of a smartphone. Typically, the haptic signal output from the haptic presentation device 10 is expressed in conjunction with an acoustic signal such as music or ambient sound, or expressed with intonation for the creator 20 to convey desired information to the user.

However, the haptic signal is a time signal represented by a frequency or strength used when the haptic presentation device 10 vibrates, and thus, outputting the haptic signal on the haptic presentation device 10 having a different frequency response or output method would make an output different each time, having a risk of producing an expression that is not intended by the creator 20. In order to avoid this, it is conceivable to prepare a plurality of haptic signals corresponding to various haptic presentation devices 10 in advance. This case, however, would increase data volume, leading to deterioration of data storage and transmission efficiencies. Furthermore, in a case where a haptic signal is newly generated from a time signal such as an acoustic signal or others instead of an exclusively prepared haptic signal, the source time signal is directly converted into a haptic signal by frequency shift or the like. At this time, in a case where the signal of the conversion source is a time signal obtained by superimposing various individual signals, a generated signal might be a haptic signal in which a plurality of signals is superimposed and that cannot perform expression according to the source signal. For example, when a haptic signal including a high ratio of vibrations corresponding to a vocal or a guitar is generated in a situation where it is desired to output, as a haptic signal, a haptic signal having a dramatic sensation emphasizing a drum sound included in a music signal, there is a possibility that an appropriate realistic feeling cannot be given to the user.

In view of this, the conversion device 100 according to the embodiment uses the following conversion processing to enable presentation of a high quality haptic sensation without depending on the haptic presentation device 10 to which the output is to be performed, and enable efficient data storage and transmission. Specifically, in order to express a conversion source signal to be a source of the haptic signal by information with a higher abstraction level, the conversion device 100 converts the conversion source signal into the intermediate representation signal 24 expressed by a plurality of parameters corresponding to human perception. Furthermore, the decoding device 200 according to the embodiment decodes the intermediate representation signal 24 expressed with a high abstraction level, and generates a haptic signal to be actually output on the haptic presentation device 10. With this configuration, the conversion device 100 and the decoding device 200 can realize haptic presentation (excellent realistic feeling) adapted to human perception without depending on the characteristics of the haptic presentation device 10 while improving the efficiency of data transfer and data retention.

Hereinafter, an outline of a flow of information processing according to the embodiment will be described with reference to FIG. 1. As illustrated in FIG. 1, the creator 20 produces a conversion source signal 22 which is an arbitrary signal. For example, the creator 20 creates the conversion source signal 22 as audio content to be provided to the user via a network.

The conversion device 100 acquires the conversion source signal 22 created by the creator 20 (step S11). The conversion device 100 executes conversion processing according to the embodiment to convert the conversion source signal 22 into the intermediate representation signal 24. Details of the conversion processing will be described below.

Thereafter, the decoding device 200 acquires the intermediate representation signal 24 via a network (step S12). At this time, the decoding device 200 acquires characteristic information regarding the haptic presentation device 10 to which the output is to be performed. For example, in a case where the haptic signal is to be output on the game controller 10A, the decoding device 200 acquires characteristic information of the game controller 10A. Thereafter, the decoding device 200 executes decoding and generation processing according to the embodiment, thereby decoding the intermediate representation signal 24 based on the intermediate representation signal 24 and the characteristic information of the haptic presentation device 10 to generate the haptic signal 26. Details of the decoding and generation processing will be described below.

The decoding device 200 controls to transmit the generated haptic signal 26 to various haptic presentation devices 10 to output the signal on the haptic presentation devices 10 (step S13). For example, the decoding device 200 transmits a haptic signal 26A generated based on the characteristics of the game controller 10A to the game controller 10A. Furthermore, the decoding device 200 transmits a haptic signal 26B generated based on the characteristics of the headphones 10B to the headphones 10B. In this manner, the decoding device 200 can transmit the haptic signal optimized for each haptic presentation device 10, making it possible to realize the optimum output according to the characteristics of the haptic presentation device 10.

Next, configurations of the conversion device 100 and the decoding device 200, and details of conversion processing and decoding processing according to the embodiment will be described with reference to FIG. 2 and subsequent drawings.

(1-2. Configuration of Conversion Device According to Embodiment)

Next, a configuration of the conversion device 100 according to the embodiment will be described with reference to FIG. 2. FIG. 2 is a diagram illustrating a configuration example of the conversion device 100 according to the embodiment.

Figure 2:
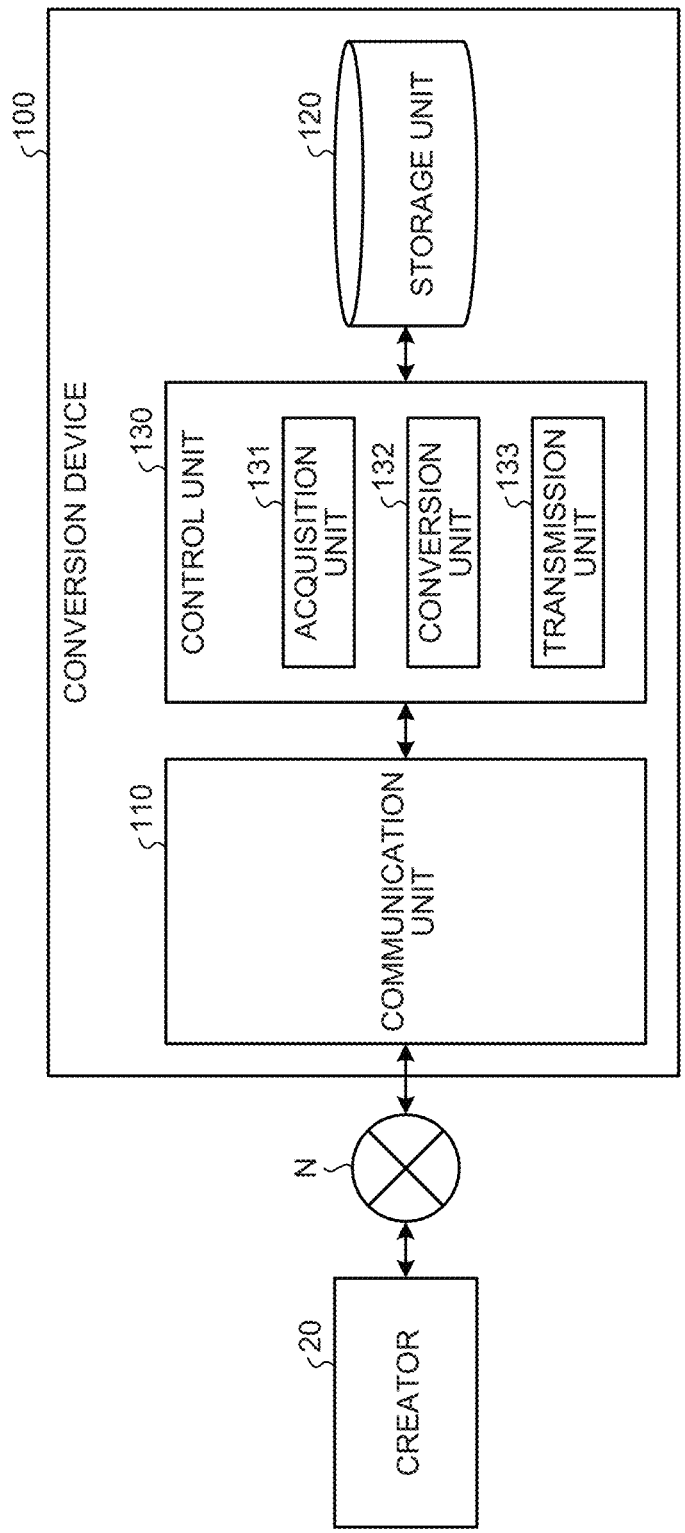
FIG. 2 is a diagram illustrating a configuration example of a conversion device according to the embodiment.

As illustrated in FIG. 2, the conversion device 100 includes a communication unit 110, a storage unit 120, and a control unit 130. Note that the conversion device 100 may include an input means (for example, a touch panel, a keyboard, or a pointing device such as a mouse, a voice input microphone, or an input camera (line-of-sight input or gesture input)) that performs various operation inputs from an administrator or the like who operates the conversion device 100.

The communication unit 110 is implemented by a network interface card (NIC), for example. The communication unit 110 is connected to a network N (Internet, near field communication (NFC), Bluetooth (registered trademark), and the like) in a wired or wireless channel, and transmits and receives information to and from the creator 20, the decoding device 200, other information devices, and the like via a network N.

The storage unit 120 is implemented by semiconductor memory elements such as random access memory (RAM) and flash memory, or other storage devices such as a hard disk or an optical disc. The storage unit 120 stores the acquired conversion source signal, the converted intermediate representation signal, and the like.

The control unit 130 is implemented by execution of programs stored in the conversion device 100 (for example, conversion program according to the embodiment, etc.) by a central processing unit (CPU), a micro processing unit (MPU), or the like, using random access memory (RAM) or the like, as a working area. In addition, the control unit 130 is a controller and may be implemented by an integrated circuit such as an application specific integrated circuit (ASIC) or a field programmable gate array (FPGA).

As illustrated in FIG. 2, the control unit 130 includes an acquisition unit 131, a conversion unit 132, and a transmission unit 133, and implements or executes a function and an action of information processing described below. The internal configuration of the control unit 130 is not limited to the configuration illustrated in FIG. 2, and may be another configuration as long as it is a configuration that performs information processing described below.

The acquisition unit 131 acquires various data used by a processing unit to perform processing in a latter stage. For example, the acquisition unit 131 acquires a conversion source signal, which is a signal to be subjected to conversion processing by the conversion unit 132 as a source of a haptic signal.

The conversion unit 132 converts the conversion source signal acquired by the acquisition unit 131 into an intermediate representation signal represented by at least one parameter. For example, the conversion unit 132 converts the conversion source signal into the intermediate representation signal represented by a single or a plurality of parameters corresponding to human perception.

Specifically, the conversion unit 132 converts the conversion source signal into an intermediate representation signal including, as parameters, an attack being a signal representing a steep rise of the output value, a harmonic component being a signal having a fundamental frequency, a noise component being a signal having no fundamental frequency, and information indicating a ratio between the harmonic component and the noise component.

Figure 3:
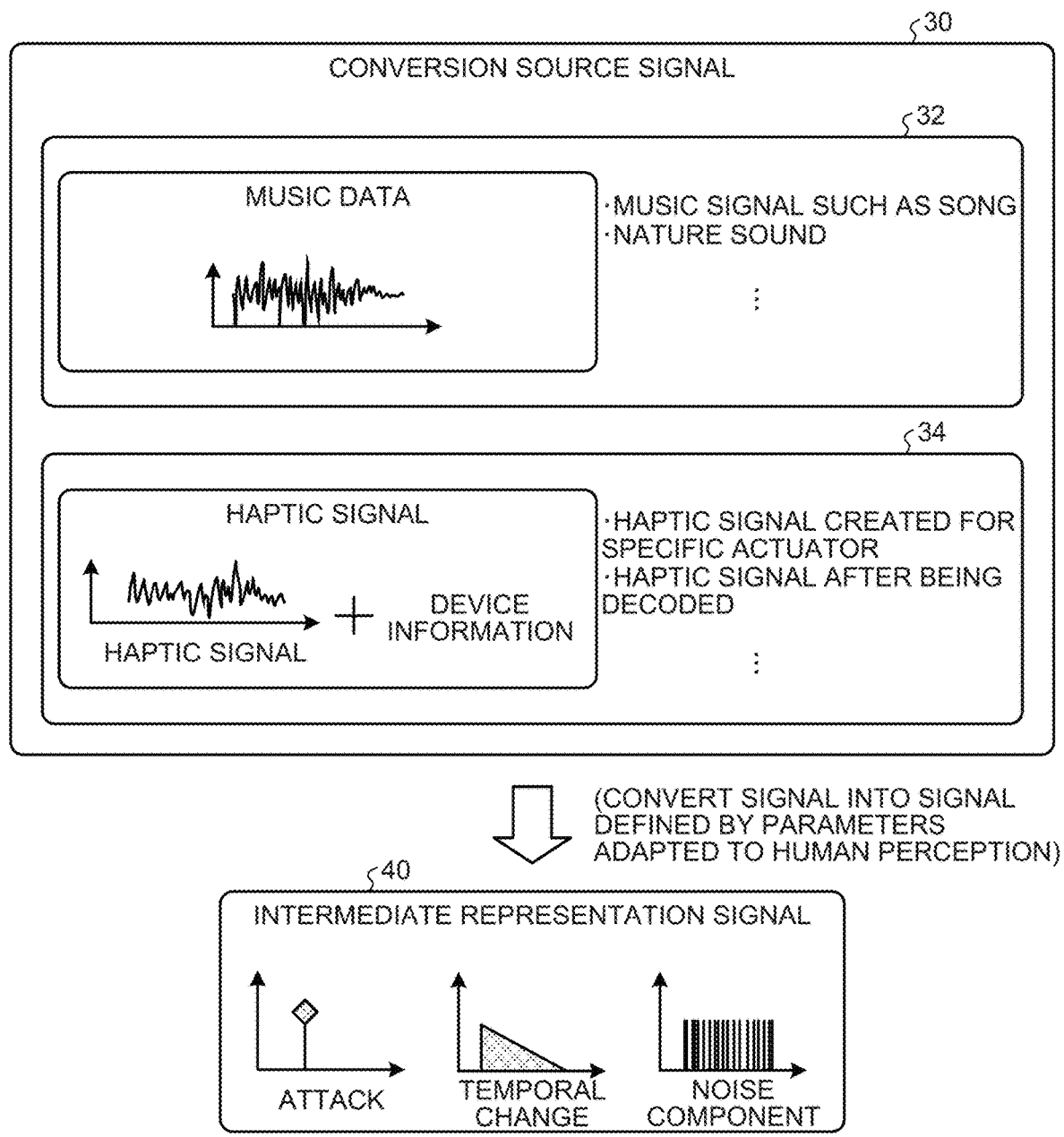
FIG. 3 is a conceptual diagram illustrating encoding into an intermediate representation signal according to the embodiment.

FIG. 3 is a conceptual diagram illustrating encoding into an intermediate representation signal according to the embodiment. In the example illustrated in FIG. 3, the acquisition unit 131 acquires a conversion source signal 30. As illustrated in FIG. 3, the conversion source signal 30 includes: music data such as a song; or an acoustic signal 32 obtained by recording a nature sound, an ambient sound, or the like, for example. Furthermore, the conversion source signal 30 may include a haptic signal 34 such as a haptic signal created for a specific actuator or a haptic signal obtained after an acoustic signal or the like has been decoded by a device other than the decoding device 200, for example.

The conversion unit 132 replaces information included in the conversion source signal 30 with information with a high abstraction level, and thereby converts the conversion source signal 30 into an intermediate representation signal 40. Specifically, the conversion unit 132 converts parameters such as an output value and a frequency included in the conversion source signal 30 into a signal defined by parameters adapted to human perception. In the embodiment, the conversion unit 132 converts the signal into the intermediate representation signal 40 including, as parameters, an attack being a signal representing a steep rise of the output value, attenuation occurring with a temporal change, and information indicating a ratio between the harmonic component and the noise component.

In this manner, the conversion unit 132 replaces parameters such as the output value and the frequency included in the conversion source signal 30 with parameters adapted to human perception, making it possible to retain the information related to haptic presentation in a format independent of a device or an actuator. Furthermore, the conversion unit 132 converts a signal such as the haptic signal 34 including characteristic information to be applied to the specific haptic presentation device 10 into the intermediate representation signal 40 expressed by the parameter not including the characteristic information, making it possible to retain the haptic signal retained in the existing format in a newly replaced format independent of the output destination.

Figure 4:
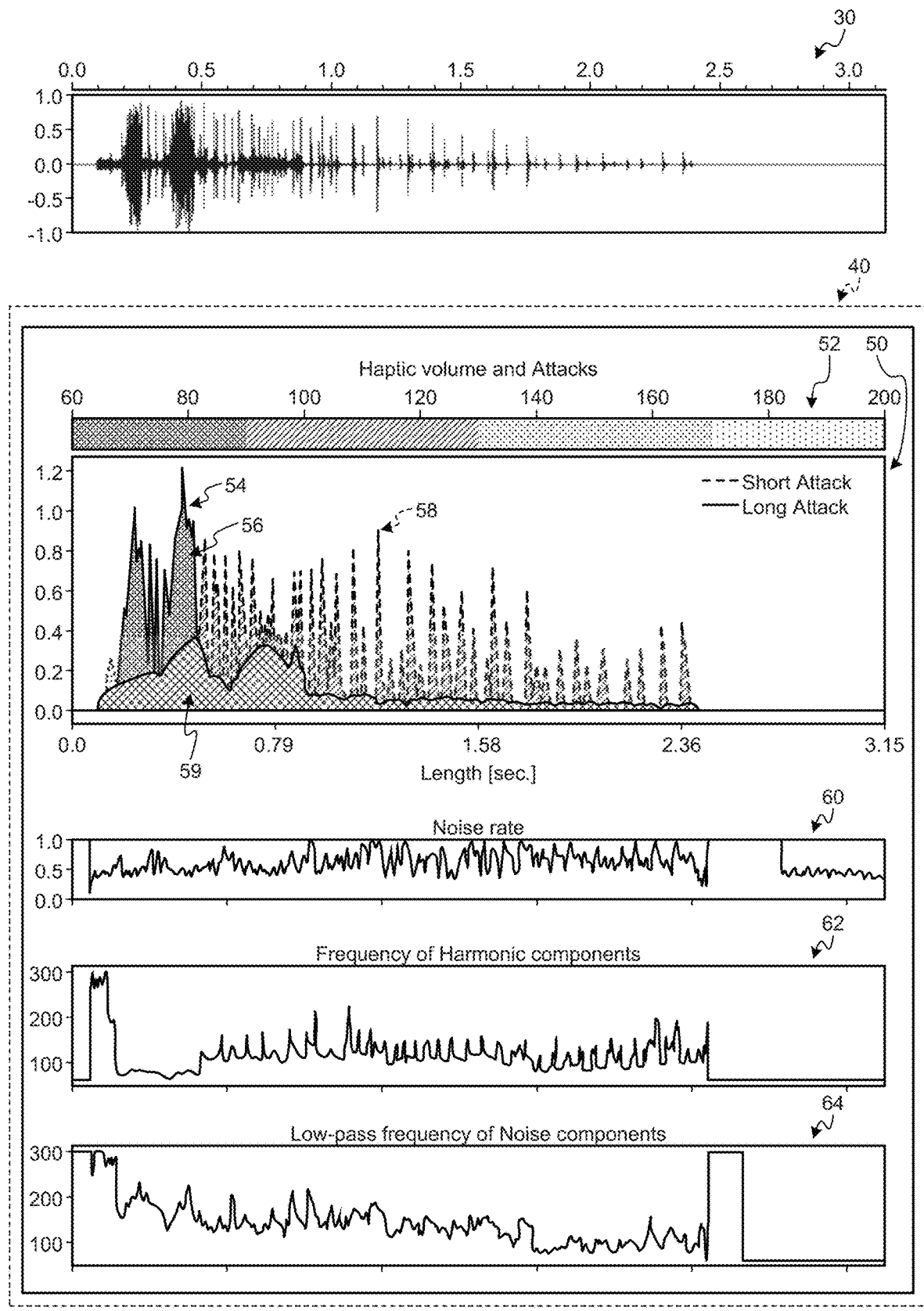
FIG. 4 is a diagram illustrating an example of the intermediate representation signal according to the embodiment.

FIG. 4 illustrates an example of the intermediate representation signal according to the embodiment. FIG. 4 is a diagram illustrating an example of an intermediate representation signal according to the embodiment. The example of FIG. 4 uses waveforms to express each parameter included in the intermediate representation signal 40 when the conversion source signal 30 is converted into the intermediate representation signal 40. Note that the vertical axis of the conversion source signal 30 illustrated in FIG. 4 represents the output value, and the horizontal axis represents time.

In the intermediate representation signal 40 illustrated in FIG. 4, a waveform 50 indicates attack information. Specifically, the waveform 50 indicates locations of attacks on the time axis, the temporal length of each attack, and the frequency corresponding to the attack. The intermediate representation signal 40 according to the embodiment defines two types of attack lengths, which are classified into a first attack ("Long Attack" illustrated in FIG. 4) that is output for a relatively long time and a second attack ("Short Attack" illustrated in FIG. 4) that is output for a relatively short time. The waveform 50 indicates alto the classification of those attacks. In addition, a frequency display 52 indicates frequencies allocated to the attacks by density or darkness of hatching.

For example, an attack 54 illustrated in FIG. 4 is a first attack that is output for a long time. Furthermore, the frequency allocated to the attack 54 is indicated by the density or darkness of hatching in a region 56, and for example, a relatively low frequency (around 80 Hz) is allocated to the attack 54. On the other hand, an attack 58 is a second attack that is output for a short time. The conversion unit 132 allocates the length and frequency of the attack 54 and the attack 58 based on the information included in the conversion source signal 30. Furthermore, the conversion unit 132 allocates an overall volume (output value) of the intermediate representation signal 40 based on the information included in the conversion source signal 30. In the example illustrated in FIG. 4, the volume is indicated as the amplitude (vertical axis) of the waveform 50.

A waveform 60 indicates a ratio between the harmonic component and the noise component. In the example of FIG. 4, it is assumed that the proportion of the harmonic component is larger as the vertical axis of the waveform 60 is closer to 1, and the proportion of the noise component is larger as the vertical axis of the waveform 60 is closer to 0.

A waveform 62 indicates a fundamental frequency of the harmonic component. In the example of FIG. 4, the vertical axis of the waveform 62 is a numerical value indicating the fundamental frequency of the harmonic component.

A waveform 64 indicates a frequency included in the noise component after passing through a low-pass filter. As described above, the noise component is a component including no fundamental frequency, that is, a component made of noise. For example, the frequency indicated by the waveform 64 is not the fundamental frequency, but indicates the frequency most included in the noise component. With this configuration, even with the same noise component, it is possible to express whether the noise component is a relatively high noise component (wind noise or the like in the case of nature sound) or a relatively low noise component.

When converting the conversion source signal 30 into the intermediate representation signal 40, the conversion unit 132 separates the conversion source signal into elements constituting the conversion source signal 30, and converts the separated signal into the intermediate representation signal 40.

For example, in the case of the acoustic signal 32 which is music data such as a song and in which a plurality of instrument sounds is superimposed, the conversion unit 132 separates the acoustic signal 32 into individual instrument sounds and converts the separated signal into the intermediate representation signal 40. Furthermore, in a case where the conversion source signal is a nature sound, an ambient sound, or the like, the conversion unit 132 separates the conversion source signal into a harmonic component being a signal having a fundamental frequency and a noise component being a signal having no fundamental frequency. In this manner, by separating the conversion source signal 30 into the elements constituting conversion source signal 30, the conversion unit 132 can perform conversion into the intermediate representation signal 40 that properly reflects representations in the conversion source signal 30.

Figure 5:
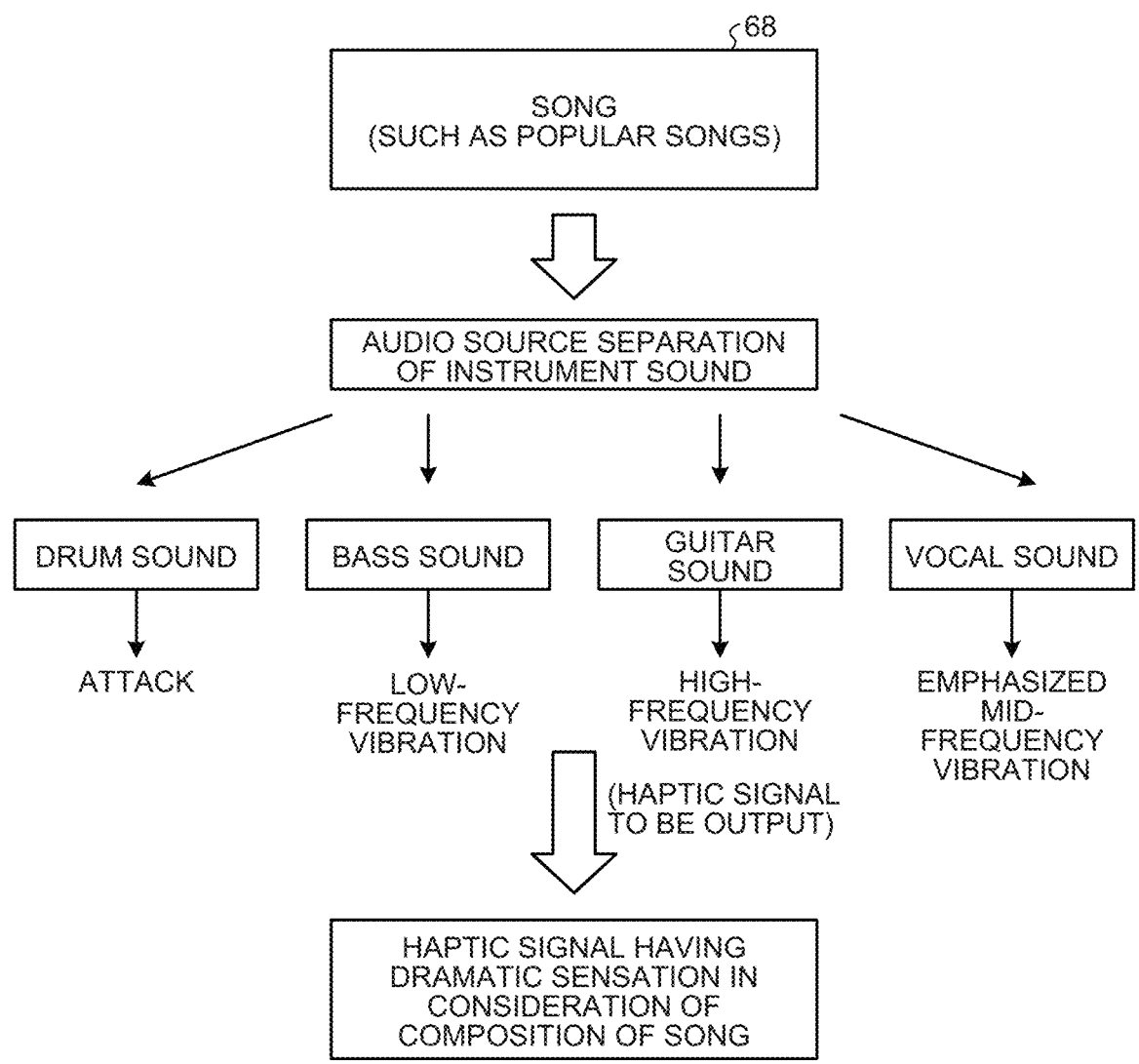
FIG. 5 is a diagram (1) illustrating an example of audio source separation according to the embodiment.

An example of audio source separation according to the embodiment will be described with reference to FIGS. 5 to 7. FIG. 5 is a diagram (1) illustrating an example of audio source separation according to the embodiment.

The example of FIG. 5 illustrates an example in which the conversion unit 132 separates a song 68 which is an example of the conversion source signal. In this example, the song 68 is a popular song in which a plurality of instrument sounds and vocal sounds are mixed. In this case, the conversion unit 132 separates the audio source for each instrument sound constituting the song 68 using a known audio source separation technology. For example, the conversion unit 132 separates the song 68 by using audio source separation processing for each instrument sound using a neural network or a non-harmonic sound separation method of separating a steep sound in a time direction, such as a drum sound by applying a median filter in a time frequency domain.

As an example, the conversion unit 132 separates the song 68 into a drum sound, a bass sound, a guitar sound, and a vocal sound. In this case, the separated instrument sound can each be an element of attack, low-frequency vibration, high-frequency vibration, and emphasized mid-frequency vibration in the intermediate representation signal. When the intermediate representation signal generated from such an element is finally decoded into the haptic signal output by the haptic presentation device 10, the signal can be a haptic signal having a dramatic sensation in consideration of the composition of the song.

Next, separation of a nature sound and an ambient sound will be described. FIG. 6 is a diagram (2) illustrating an example of audio source separation according to the embodiment. Note that the nature sound and the ambient sound represent sounds or the like recorded in nature or in town.

Figure 6:
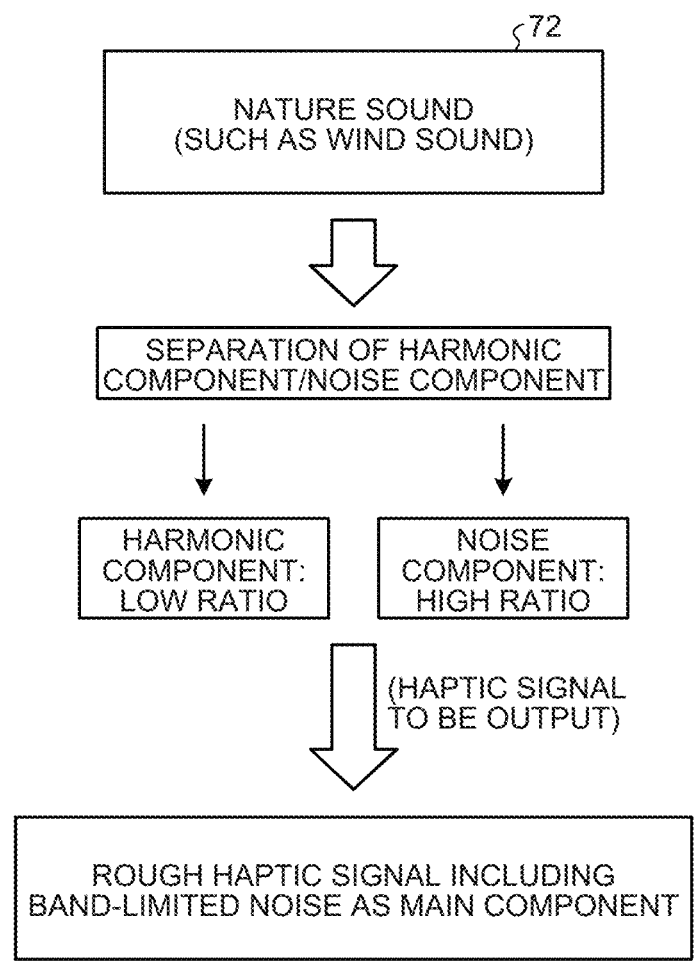
FIG. 6 is a diagram (2) illustrating an example of audio source separation according to the embodiment.

The example of FIG. 6 illustrates an example in which the conversion unit 132 separates a nature sound 72 which is an example of the conversion source signal. In this case, the conversion unit 132 separates the sound constituting the nature sound 72 into a harmonic component and a noise component. For example, if the nature sound 72 is a wind sound, it is assumed that the sound has less harmonic components and more noise components. The noise component can be considered to be a signal component having similar power extensively in the frequency domain. In addition, the harmonic component can be considered to be a signal component in which a specific frequency has great power in the frequency domain.

When the intermediate representation signal generated from such elements is finally decoded into a haptic signal to be output by the haptic presentation device 10, the signal can be a rough haptic signal including band-limited noise as a main component.

Incidentally, when separating a nature sound or an ambient sound, the conversion unit 132 can also extract only a sound to be particularly emphasized included in the sound, for example. As an example, the conversion unit 132 can separate the sound of birds chirp mixed in the wind sound as an element. For example, the conversion unit 132 can separate the sound of birds chirp from other nature sounds by using a machine learning model specialized for extracting the sound of birds chirp.

Next, separation of a nature sound and an ambient sound different from the example of FIG. 6 will be described. FIG. 7 is a diagram (3) illustrating an example of audio source separation according to the embodiment.

Figure 7:
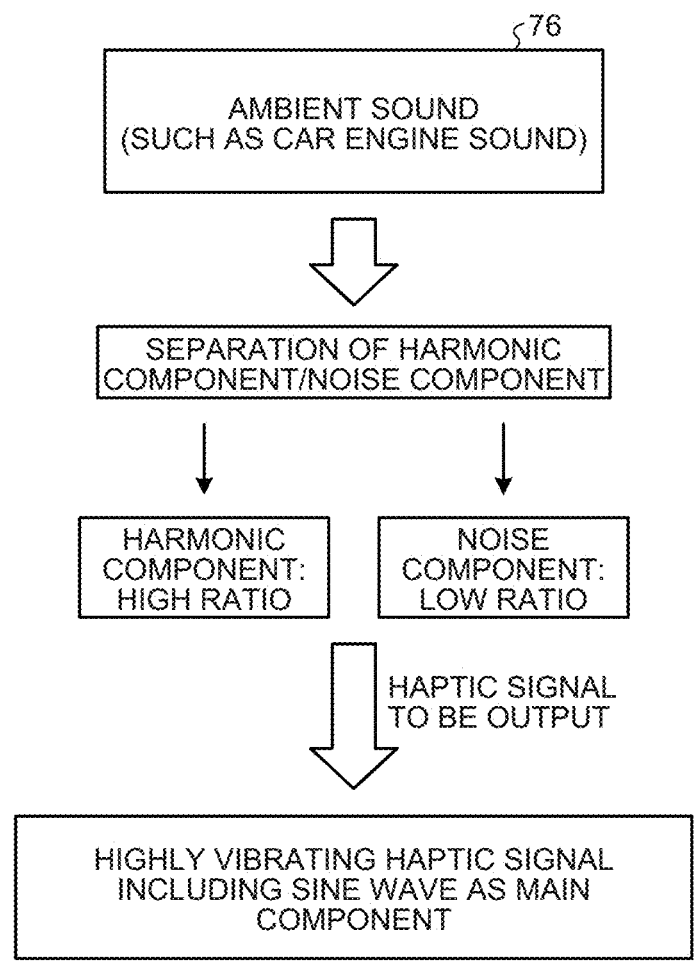
FIG. 7 is a diagram (3) illustrating an example of audio source separation according to the embodiment.

The example of FIG. 7 illustrates an example in which the conversion unit 132 separates an ambient sound 76 being an example of the conversion source signal. The ambient sound 76 is supposed to be sound data obtained by recording a situation including many car engine sounds and the like. The ambient sound 76 illustrated in the example of FIG. 7 may be a sound effect (car driving sound in game, impact sound when object hits wall or floor, etc.) produced for a game or a piece of video content. Also in this case, signal separation is to be performed as separation into a harmonic component and a noise component.

That is, similarly to FIG. 6, the conversion unit 132 separates the sound constituting the ambient sound 76 into a harmonic component and a noise component. For example, in the case of a car driving sound, road noise includes a high ratio of noise component and an engine sound includes a high ratio of harmonic component. For this reason, the ambient sound 76 mainly including the car engine sound is assumed to have a high ratio of harmonic component and relatively low ratio of noise component after separation. In the separation of the noise component, the conversion unit 132 may also use a known separation technique such as a method of separating sound that does not change for a long time as noise (spectral subtraction method or the like) or processing of separating steep frequency components for each time frame of a spectrogram.

When the intermediate representation signal generated from the element separated in an example illustrated in FIG. 7 is finally decoded into a haptic signal to be output by the haptic presentation device 10, the intermediate representation signal can be a highly vibrating haptic signal including a sine wave as a main component.

Next, processing of extracting information from each separated audio source and actually converting the information into an intermediate representation signal will be described. Note that all the intermediate representation signal extraction methods described below may be applied to each of the separated signals obtained by the signal separation, or may be selectively applied to each of the separated signals in consideration of the characteristics of separated signals individually. In addition, the method may be directly applied to the conversion source signal before separation.

Figure 8:
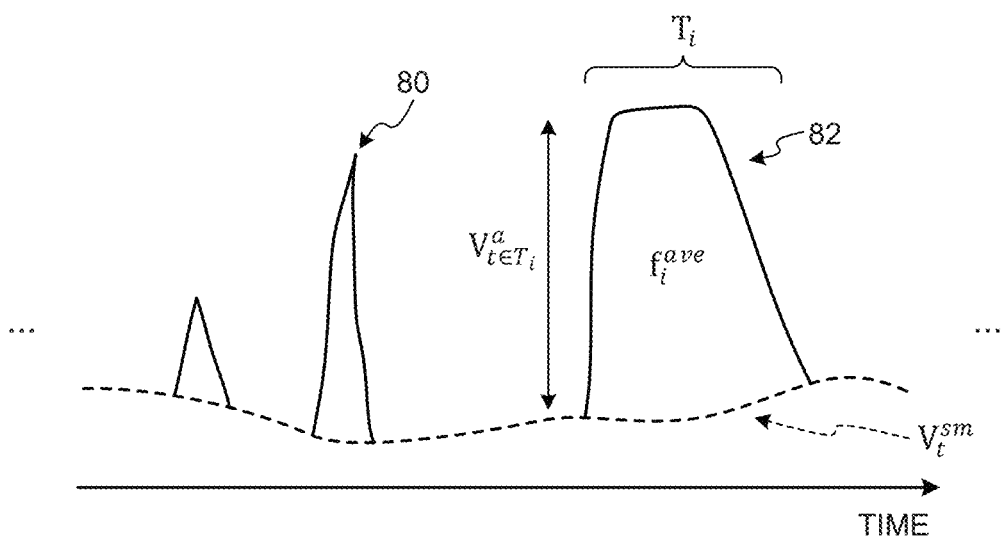
FIG. 8 is a diagram illustrating an attack in the intermediate representation signal according to the embodiment.

First, generation of an attack in the intermediate representation signal will be described. FIG. 8 is a diagram illustrating an attack in an intermediate representation signal according to the embodiment. Hereinafter, a result of transforming a time signal (conversion source signal) to be converted into an intermediate representation signal into a spectrogram (time-frequency representation by short-time Fourier transform) with a certain frame width and a certain shift width is represented as "$X_{tf}$" (t represents time, and f represents frequency).

As described above, the attack is to parameterize a portion having a steep power change in the time direction in the conversion source signal. For example, regarding an output value change for each time unit in the conversion source signal, the conversion unit 132 refers to a difference from a value obtained by leveling the output value in a predetermined time width, and extracts a section in which the referred value exceeds a reference output value as an attack.

In the embodiment, the attack parameter is calculated using, for example, processing of removing a steep temporal change, such as a median filter, with respect to an amplitude contour for each time frame. In the following description, the amplitude contour is represented as "$V_t$".

When an amplitude contour from which a steep temporal change is removed is "$V_t\hat{\ }sm$", "$V_t\hat{\ }a$" indicating a contour of the attack alone is expressed by the following Formula (1). A visual expression of "$V_t\hat{\ }sm$" is demonstrated as a waveform from which a steep temporal change has been removed, as illustrated in FIG. 8.

$$V_t^a = V_t - V_t^{sm} \quad (1)$$

Next, in "$V_t\hat{\ }a$", the conversion unit 132 combines a group connected in the time direction as one attack. For example, the conversion unit 132 extracts an attack 80 and an attack 82 illustrated in FIG. 8 as a group in a predetermined time section.

In addition, each frequency power of the conversion source signal in the attack portion typically has a high relation with the haptic signal as a corresponding signal. That is, the lower the frequency of the conversion source signal, the lower the frequency of the corresponding haptic signal will be as a matter of course. Therefore, the conversion unit 132 may allocate the frequency corresponding to each attack based on the conversion source signal.

For example, the conversion unit 132 allocates the frequency corresponding to each attack based on a weighted average frequency of the signal in the section corresponding to the attack in the conversion source signal. That is, in order to provide the frequency information to each attack, the conversion unit 132 calculates the weighted average frequency by the frequency power in the frame in which the target attack is located as indicated by the following Formula (2), for example.

$$f_i^{ave} = \frac{\sum_{t \in T_i} \sum_f (f \times |X_{tf}|)}{\sum_{t \in T_i} \sum_f (|X_{tf}|)} \quad (2)$$

In the above Formula (2), "i" is an index indicating each attack. "$T_i$" is a set of time frames in which each attack is located.

Here, the haptic characteristics of the attack change depending on the temporal length, and thus, a mechanism for separately extracting attacks having different lengths may be included so as to express this change in characteristics. That is, the conversion unit 132 may convert the conversion source signal into an intermediate representation signal including a first attack having a long output duration and a second attack having a shorter output duration as compared with the first attack. The attack length classification can be implemented by changing the filter length in the above-described median filter, for example. That is, when the filter length is decreased, only a short attack is extracted, and when the filter length is increased, a longer attack is extracted. In the example illustrated in FIG. 8, the attack 80 is an example of a short attack, and the attack 82 is an example of a long attack.

With the above processing, the conversion unit 132 can set position information, length information "$T_i$", frequency information "$f_i\hat{\ }ave$", and power information "$V_{(t \in Ti)}\hat{\ }a$" as attack parameters for the i-th attack. FIG. 8 illustrates the attack 82 as an example of the i-th attack, the power of the attack is indicated as "$V_{(t \in Ti)}\hat{\ }a$" which is an amount of rise, and information regarding the attack further includes frequency information "$f_i\hat{\ }ave$" indicating a frequency. Note that "$V_t\hat{\ }sm$" illustrated in FIG. 8 corresponds to a waveform 59 illustrated in FIG. 4, and the frequency information "$f_i\hat{\ }ave$" corresponds to the region 56. That is, the conversion unit 132 extracts, from the conversion source signal, information visualized as attack parameters in the waveform 50 illustrated in FIG. 4. Although the attack parameters are indicated by waveforms in the examples illustrated in FIGS. 4 and 8, the attack parameters in the intermediate representation signal and parameters to be described below are to be recorded as coded numerical information in practice.

Next, the noise component ratio in the intermediate representation signal will be described. As described above, the conversion unit 132 separates the conversion source signal into a harmonic component and a noise component, and the parameter indicating the noise component ratio is a ratio at which the noise component is included in each time frame in the conversion source signal. The noise ratio is high in noisy sounds such as wind sounds, and is low in sounds with many harmonic components such as wind instrument sounds.

The calculation of the noise ratio parameter can be performed using the separation of the noise component and the harmonic component exemplified in the signal separation for the sound effect and the like. Here, when the spectrogram of each separated component is expressed by "$X_{tf}\hat{\ }n$" (n indicates a noise component) and "$X_{tf}\hat{\ }h$" (h indicates a harmonic component), the noise ratio parameter "$N_t$" in a time frame t is expressed by the following Formula (3).

$$N_t = \frac{\sum_f (|X_{tf}^n|)}{\sum_f (|X_{tf}^n + X_{tf}^h|)} \quad (3)$$

The noise ratio parameter represented by the above Formula (3) is useful for the purpose of adjusting roughness or the like of a haptic signal, for example.

Next, the frequency of the noise component in the intermediate representation signal will be described. As described above, the conversion unit 132 may use the frequency corresponding to the noise component as one of the parameters of the intermediate representation signal. The noise component frequency parameter is a parameter used to determine a noise component when a haptic signal is output, for example.

For example, the conversion unit 132 can calculate the frequency range of a band pass filter calculated from the noise component included in the conversion source signal, as the frequency parameter of the noise component. The noise component frequency parameter is useful for the purpose of expressing, for example, a rough haptic sensation (for example, irregular vibration) corresponding to the conversion source signal.

Next, the frequency of the harmonic component in the intermediate representation signal will be described. As described above, the conversion unit 132 may use the frequency corresponding to the harmonic component as one of the parameters of the intermediate representation signal. The harmonic component frequency parameter is a parameter used to determine a harmonic component output as a haptic signal, for example.

For example, the conversion unit 132 can calculate the frequency of the sine wave extracted as a harmonic component included in the conversion source signal, as the frequency parameter of the harmonic component. The harmonic component frequency parameter is useful for the purpose of expressing, for example, a vibrating haptic sensation (for example, regular vibration) corresponding to the conversion source signal.

As described above, based on the conversion source signal, the conversion unit 132 allocates the frequency corresponding to each of the harmonic component and the noise component. With this configuration, the conversion unit 132 can generate an intermediate representation signal that can precisely reproduce haptic presentation intended by the creator 20 or the like.

Description will be continued by returning to FIG. 2. The transmission unit 133 transmits the intermediate representation signal converted by the conversion unit 132 to the processing unit in a latter stage. For example, the transmission unit 133 transmits the intermediate representation signal to the decoding device 200 that decodes the intermediate representation signal.

(1-3. Procedure of Conversion Processing According to Embodiment)

Figure 9:
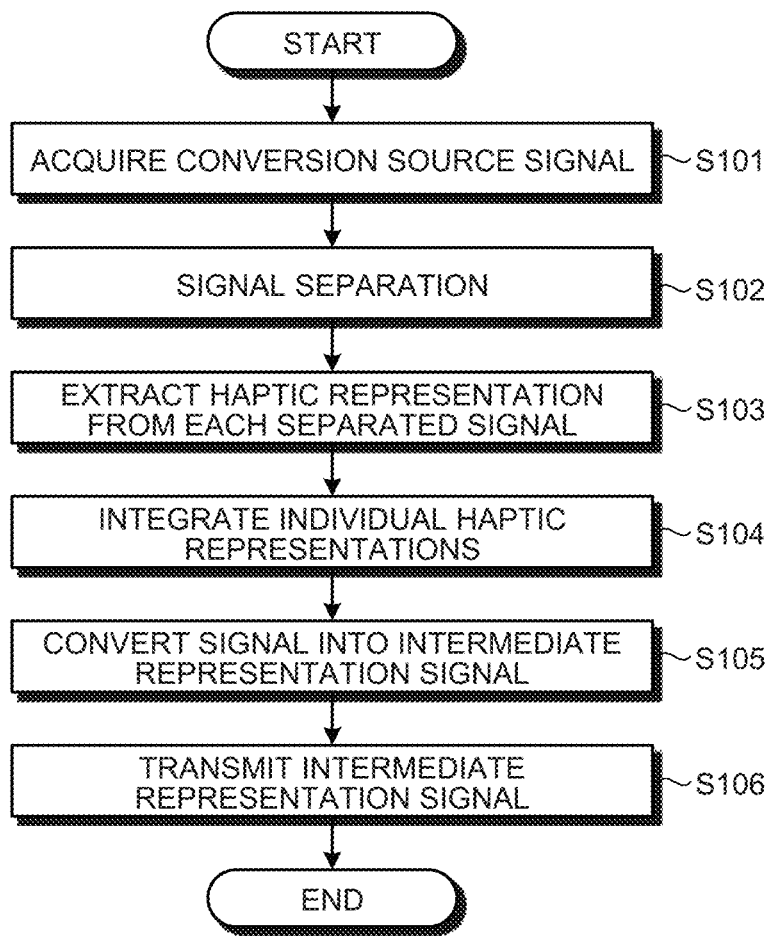
FIG. 9 is a flowchart illustrating a procedure of conversion processing according to the embodiment.

FIG. 9 illustrates a flow of conversion processing according to the embodiment. FIG. 9 is a flowchart illustrating a procedure of conversion processing according to the embodiment.

As illustrated in FIG. 9, first, the conversion device 100 acquires a conversion source signal (step S101). Subsequently, the conversion device 100 performs signal separation processing on the acquired conversion source signal (step S102).

Next, the conversion device 100 extracts a haptic representation from each separation signal (step S103). The haptic representation is an element that can be a source of haptic presentation to the user, such as the attack, the noise component, and the harmonic component described above. The conversion device 100 integrates the extracted haptic representations (step S104).

The conversion device 100 converts the conversion source signal into the intermediate representation signal based on the integrated information (step S105). Thereafter, the conversion device 100 transmits, via a network or the like, the intermediate representation signal to a device (the decoding device 200 or the like) capable of performing decoding processing on the intermediate representation signal (step S106).

(1-4. Configuration of Decoding Device According to Embodiment)

Figure 10:
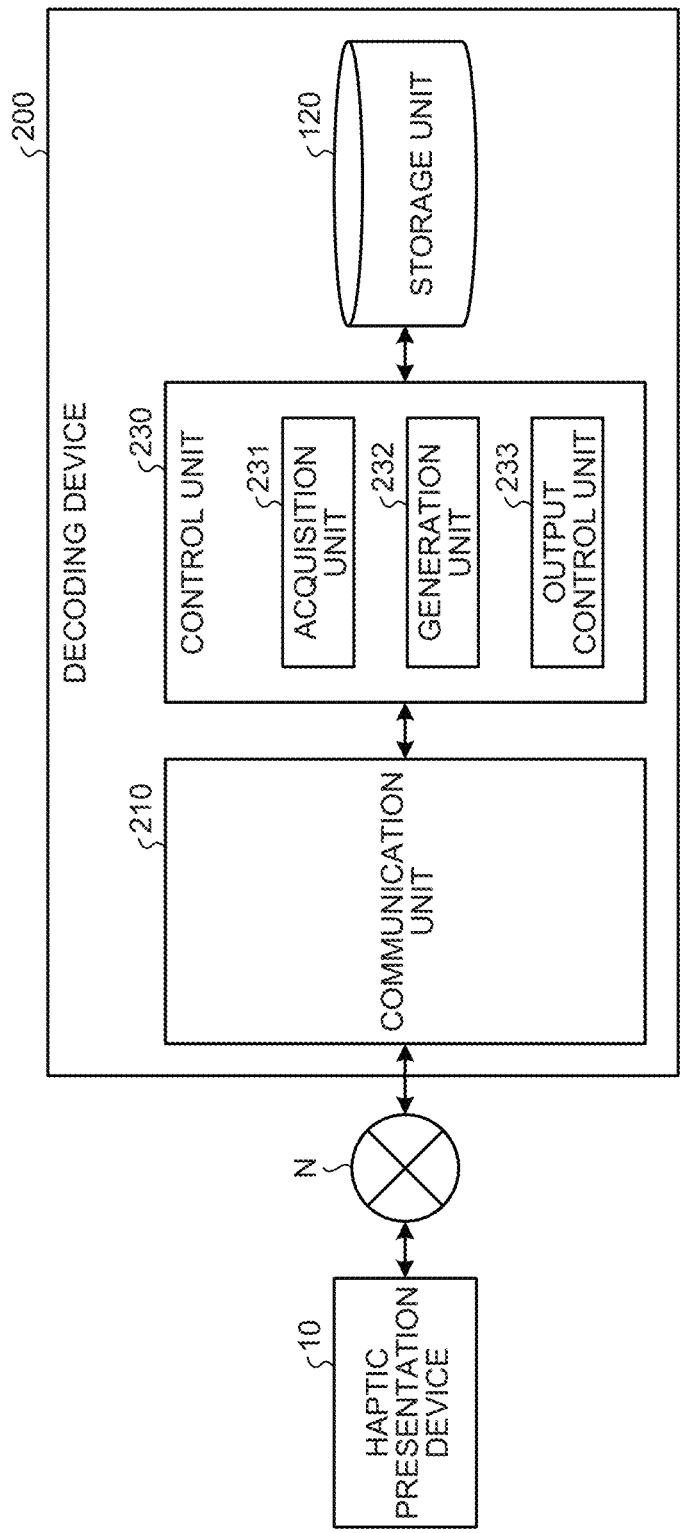
FIG. 10 is a diagram illustrating a configuration example of a decoding device according to the embodiment.

Next, decoding processing of the intermediate representation signal will be described. First, a configuration of the decoding device 200 according to the embodiment will be described with reference to FIG. 10. FIG. 10 is a diagram illustrating a configuration example of the decoding device 200 according to the embodiment.

As illustrated in FIG. 2, the decoding device 200 includes a communication unit 210, a storage unit 220, and a control unit 230. Note that the decoding device 200 may include an input means (for example, a touch panel, a keyboard, or a pointing device such as a mouse, a voice input microphone, or an input camera (line-of-sight input or gesture input)) that performs various operation inputs from the user or the like who operates the decoding device 200.

The communication unit 210 is implemented by a NIC, for example. The communication unit 210 is connected to a network N in a wired or wireless channel, and transmits/receives information to/from devices such as the haptic presentation device 10 and the conversion device 100 via the network N.

The storage unit 220 is implemented by a semiconductor memory element such as RAM or flash memory, or a storage device such as a hard disk or an optical disk, for example. The storage unit 220 stores the acquired intermediate representation signal, the decoded haptic signal, and the like.

The control unit 230 is implemented by execution of programs stored in the decoding device 200 (for example, a decoding program according to the embodiment) by the CPU, MPU, or the like, using RAM or the like as a working area. Furthermore, the control unit 230 may be a controller and may be implemented by using an integrated circuit such as an ASIC or an FPGA, for example.

As illustrated in FIG. 10, the control unit 230 includes an acquisition unit 231, a generation unit 232, and an output control unit 233, and implements or executes functions and operations of information processing described below. The internal configuration of the control unit 230 is not limited to the configuration illustrated in FIG. 10, and may be another configuration as long as it is a configuration that performs information processing described below.

The acquisition unit 231 acquires various data used for processing by a processing unit in a latter stage. For example, the acquisition unit 231 acquires an arbitrary signal in which information regarding expression of haptic presentation is recorded. Specifically, the acquisition unit 231 acquires the intermediate representation signal obtained by converting the conversion source signal by the conversion device 100.

That is, the acquisition unit 231 acquires an intermediate representation signal including, as parameters, an attack being information representing a steep rise of the output value, a harmonic component being information having a fundamental frequency, a noise component being information having no fundamental frequency, and information indicating a ratio between the harmonic component and the noise component.

Furthermore, the acquisition unit 231 acquires characteristic information related to an output unit that performs haptic presentation based on the intermediate representation signal and the like. The output unit may be paraphrased with the haptic presentation device 10. That is, the acquisition unit 231 acquires information such as characteristics of an element that actually vibrates based on the haptic signal and characteristics of the haptic presentation device 10 that controls the element. The characteristic information may include information such as a human physical part on which the output unit of the haptic presentation device 10 is worn, the number of output units included in the haptic presentation device 10, and the like.

The generation unit 232 generates a haptic signal that is a signal controlling the output of the output unit based on the intermediate representation signal acquired by the acquisition unit 231. For example, the generation unit 232 decodes the intermediate representation signal acquired by the acquisition unit 231 and adjusts the decoded signal based on the characteristic information and thereby generates a haptic signal. Alternatively, the generation unit 232 adjusts the signal obtained by decoding the intermediate representation signal based on the characteristic information, and thereby generates a haptic signal. That is, the generation unit 232 has a function of decoding the intermediate representation signal. As described above, when decoding the intermediate representation signal into the haptic signal as decoding processing, the generation unit 232 may adjust the intermediate representation signal itself based on the characteristic information or the like and thereafter composite (generate) the intermediate representation signal into the haptic signal, or may first decode the intermediate representation signal into the haptic signal and thereafter adjust the haptic signal based on other information such as characteristic information. Note that the generation unit 232 does not necessarily need to use all the acquired characteristic information, and for example, may use only minimum information necessary for output, such as information for identifying an output unit serving as an output destination, as the characteristic information.

Figure 11:
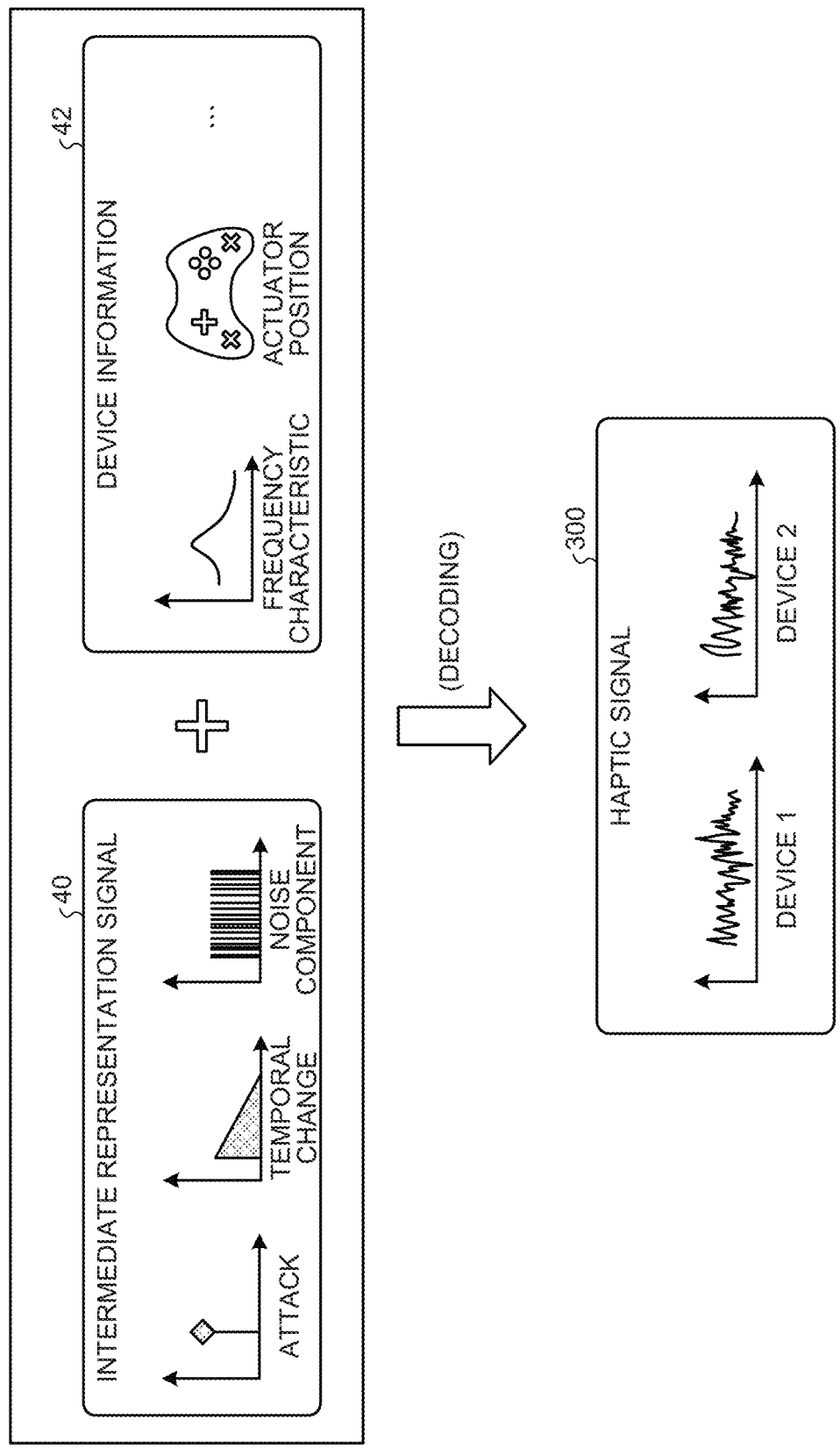
FIG. 11 is a conceptual diagram illustrating decoding of the intermediate representation signal according to the embodiment.

FIG. 11 is a conceptual diagram illustrating decoding of an intermediate representation signal according to the embodiment. In the example illustrated in FIG. 11, the acquisition unit 231 acquires the intermediate representation signal 40 and device information (characteristic information) 42. As illustrated in FIG. 11, the intermediate representation signal 40 includes parameters such as an attack, a temporal change, and a noise component. Furthermore, the device information 42 includes information such as a frequency characteristic of the output unit and a position and the number of output units provided in the haptic presentation device 10.

The generation unit 232 decodes the intermediate representation signal 40 based on the acquired information, and thereby generates a haptic signal 300 for actually driving the output unit. As illustrated in FIG. 11, the generation unit 232 decodes the intermediate representation signal 40 also using the device information, and thus can generate a plurality of haptic signals corresponding to individual haptic presentation devices 10 from one intermediate representation signal 40.

With this configuration, the generation unit 232 can present an appropriate sensation to the user regardless of the characteristics of the device to be output. Specifically, the generation unit 232 handles the intermediate expression in a state where the device-dependent information has been removed, making it possible to generate an appropriate haptic signal even with a change in the actuator intended to be used for output by the creator 20. Furthermore, the generation unit 232 decodes common data distributed in the device-independent state appropriately for each device, making it possible to reduce the amount of data related to data distribution or the like.

Although the embodiment describes an example in which the generation unit 232 generates the haptic signal based on the intermediate representation signal 40 generated by the conversion device 100, the information to be decoded by the generation unit 232 is not limited to the intermediate representation signal 40. That is, the generation unit 232 can generate a haptic signal based on a method described below as long as the signal is a signal including an axis having a high abstraction level based on some haptic representation (for example, a signal obtained by encoding an expression based on human perception, such as roughness, hardness, and strength).

Figure 12:
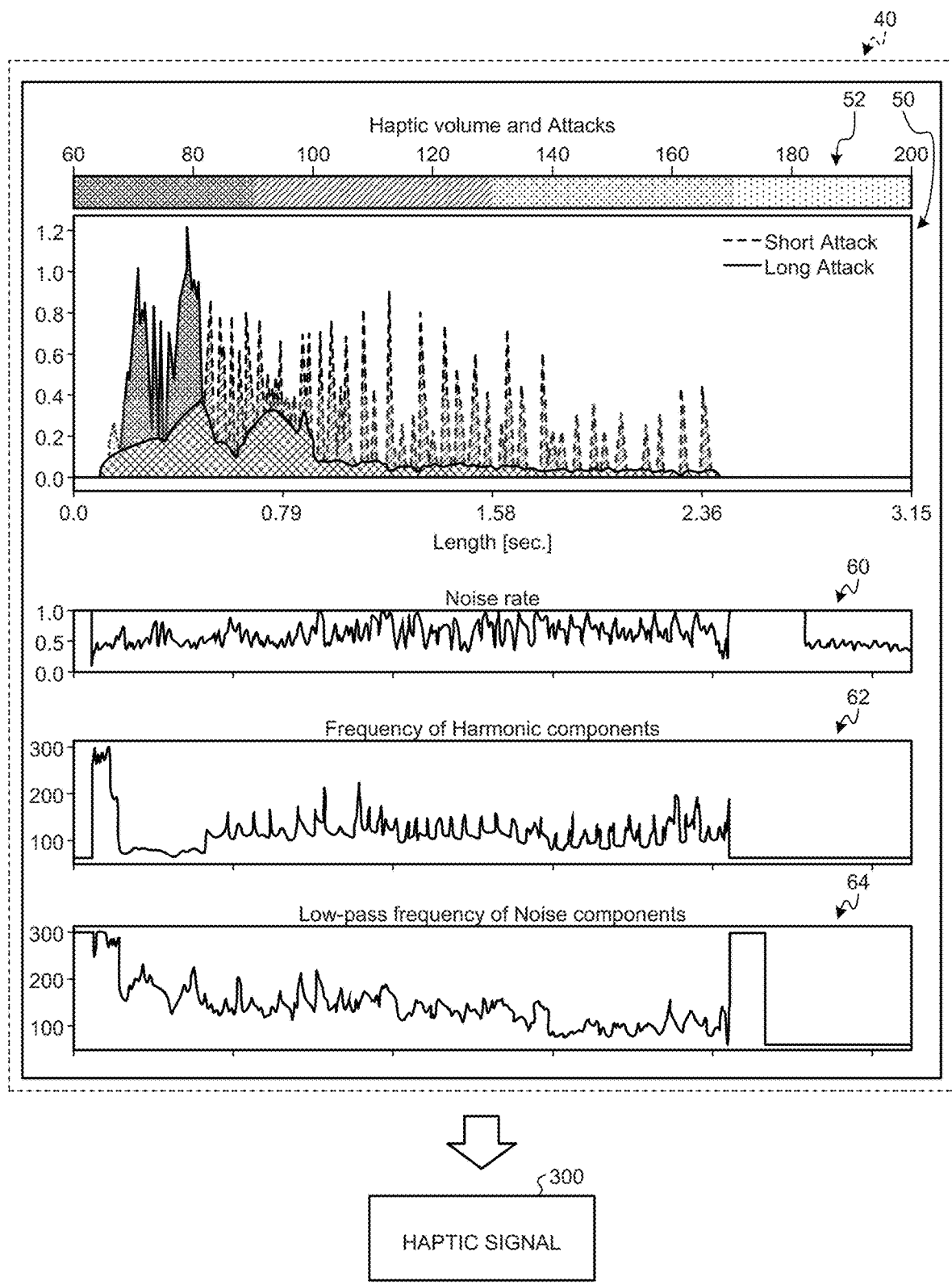
FIG. 12 is a diagram illustrating an example of an intermediate representation signal that is a target of decoding processing according to the embodiment.

FIG. 12 illustrates an example of the intermediate representation signal 40 handled by the generation unit 232. FIG. 12 is a diagram illustrating an example of an intermediate representation signal 40 that is a target of decoding processing according to the embodiment. The intermediate representation signal 40 illustrated in FIG. 12 is a signal generated by the conversion device 100, and is the same as the intermediate representation signal 40 illustrated in FIG. 4. That is, the intermediate representation signal 40 does not include device-dependent information, and includes the ratio of the attack, the noise component, and the harmonic component, the frequencies of these components, which are parameters adapted to human perception. Based on the parameter included in the intermediate representation signal 40, the generation unit 232 generates a haptic signal to be actually output by the haptic presentation device 10.

Details of the decoding processing and the generation processing according to the embodiment will be described below with reference to FIGS. 13 to 25. FIG. 13 is a diagram (1) illustrating an example of decoding processing according to the embodiment.

The example of FIG. 13 illustrates decoding processing based on the attack parameter, out of the intermediate representation signal 40. FIG. 13 illustrates a waveform 50 that visually expresses the attack parameter.

Among the waveform 50, a waveform 310 including two arbitrary attacks will be described as an example. The waveform 310 is a simplified representation of only two triangular waves each indicating an attack. The vertical axis of the waveform 310 schematically indicates the strength of the attack. A waveform 312 indicates the level of a main frequency of a harmonic component in the intermediate representation signal 40.

As an example, when decoding the waveform 50, the generation unit 232 performs processing of the signal such that, the higher the strength of the attack, the greater the amplitude in the decoded signal, and the higher the frequency of the original signal, the higher the frequency in the decoded signal. For example, the generation unit 232 decodes the waveform 310 and the waveform 312 into a signal indicated by a waveform such as a waveform 314 illustrated in FIG. 13. Note that the waveform 314 indicates the strength of the signal by the height of the amplitude, and indicates the level of the frequency by the number of repetitions of the amplitude.

Next, another example will be described with reference to FIG. 14. FIG. 14 is a diagram (2) illustrating an example of decoding processing according to the embodiment. The example of FIG. 14 illustrates decoding processing based on a noise component in the intermediate representation signal 40. FIG. 14 illustrates a waveform 60 indicating the ratio between the noise component and the harmonic component and a waveform 64 indicating the frequency of the noise component.

A waveform 320 is a part of the waveform 60 for a certain period of time schematically illustrating only a change in the noise ratio. The vertical axis of the waveform 320 indicates the ratio of noise components, indicating, for example, the larger the value of the vertical axis is, the more noise components are present. In addition, a waveform 322 indicates a change in the frequency of the noise component in the quantity of time corresponding to the waveform 320. The vertical axis of the waveform 322 indicates the level of the frequency of the noise component.

As an example, the generation unit 232 sets the amplitude of the noise component when the waveform 60 and the waveform 64 are decoded such that the greater the overall volume and the noise ratio, the greater the amplitude will be. In addition, the generation unit 232 sets such that the higher the frequency of the noise component, the higher the frequency of the noise component of the signal having been decoded. As described above, the overall volume is a parameter indicating the magnitude of the output signal according to time, and corresponds to the vertical axis of the waveform 50 in the case of the signal before decoding (intermediate representation signal 40).

For example, the generation unit 232 decodes the waveform 320 and the waveform 322 into a signal indicated by a waveform such as a waveform 324 illustrated in FIG. 14. The waveform 324 indicates a magnitude and a frequency of a noise component in the haptic signal. Note that the waveform 324 indicates the strength (magnitude) of the signal by the height of the amplitude, and indicates the level of the frequency by the number of repetitions of the amplitude.

Next, another example will be described with reference to FIG. 15. FIG. 15 is a diagram (3) illustrating an example of decoding processing according to the embodiment. The example of FIG. 15 illustrates decoding processing based on a harmonic component of the intermediate representation signal 40. FIG. 15 illustrates a waveform 60 indicating the ratio between the noise component and the harmonic component and a waveform 62 indicating the frequency of the harmonic component.

A waveform 330 is a part of the waveform 60 for a certain period of time schematically illustrating only a change in the noise ratio. The vertical axis of the waveform 330 indicates the ratio of noise components, indicating, for example, the larger the value of the vertical axis is, the more noise components are present. In addition, a waveform 332 indicates a change in the frequency of the harmonic component in the quantity of time corresponding to the waveform 330. The vertical axis of the waveform 332 indicates the level of the frequency of the harmonic component.

As an example, the generation unit 232 sets the amplitude of the harmonic component when the waveform 60 and the waveform 62 are decoded such that the smaller the overall volume and the noise ratio, the greater the amplitude will be. In addition, the generation unit 232 sets such that the higher the frequency of the harmonic component, the higher the frequency of the harmonic component of the decoded signal.

For example, the generation unit 232 decodes the signal having the waveform 330 and the waveform 332 into a signal represented by a waveform such as a waveform 334 illustrated in FIG. 15. The waveform 334 indicates a magnitude and a frequency of a harmonic component in the haptic signal. Note that the waveform 334 indicates the strength (magnitude) of the signal by the height of the amplitude, and indicates the level of the frequency by the number of repetitions of the amplitude.

Figure 16:
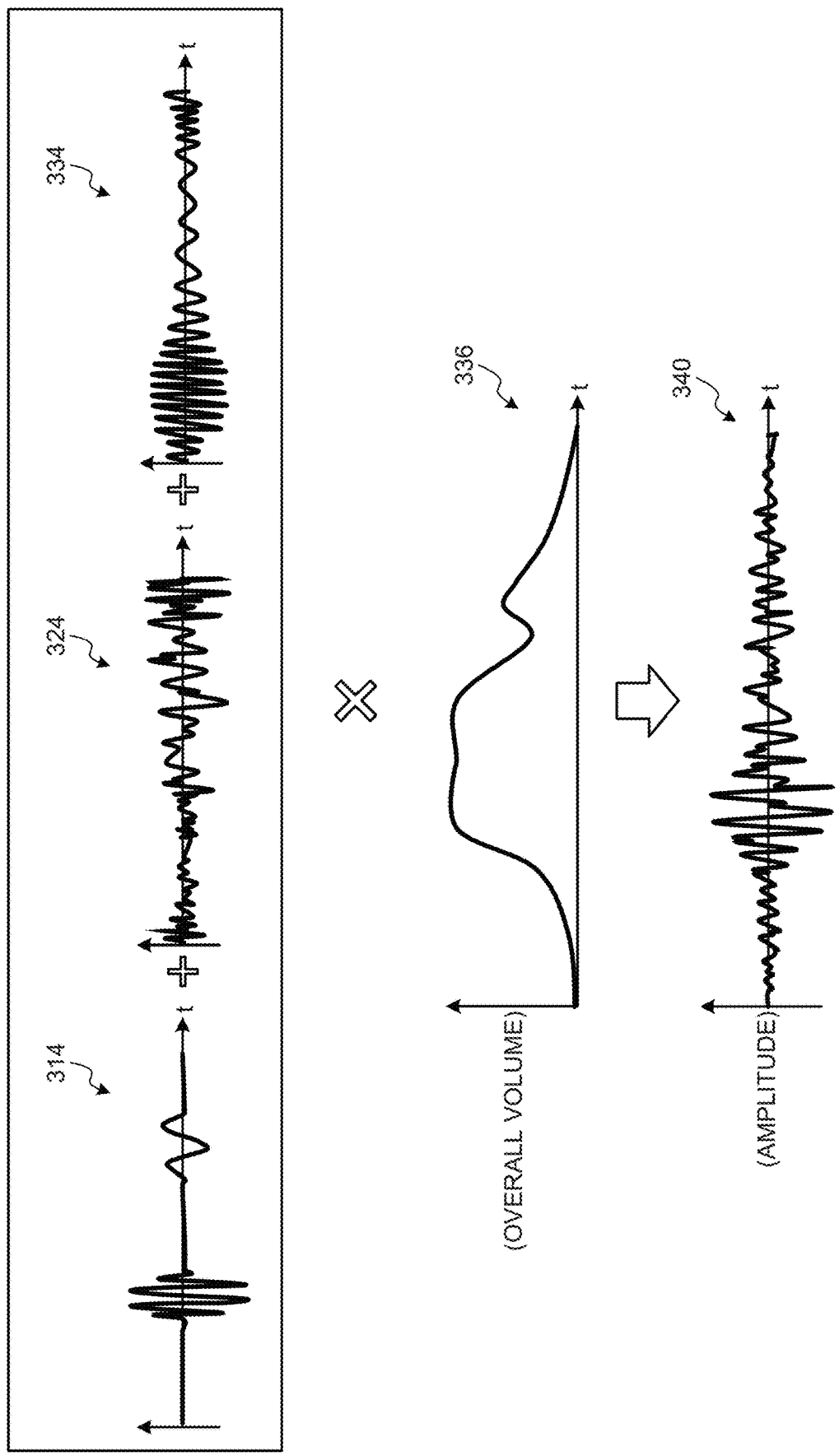
FIG. 16 is a diagram illustrating an example of generation processing according to the embodiment.

The above has described an example in which the generation unit 232 extracts the information indicated by the waveform 314, the waveform 324, and the waveform 334 from the parameters included in the intermediate representation signal 40. The generation unit 232 integrates these pieces of information to generate a haptic signal. The processing will be described with reference to FIG. 16. FIG. 16 is a diagram illustrating an example of the generation processing according to the embodiment.

In the example illustrated in FIG. 16, the generation unit 232 integrates the information indicated by the waveform 314, the waveform 324, and the waveform 334. Specifically, the generation unit 232 combines the amplitudes along the time axis corresponding to the three waveforms.

Furthermore, the generation unit 232 integrates the overall volume in the intermediate representation signal 40. A waveform 336 illustrated in FIG. 16 illustrates the magnitude of the volume in the intermediate representation signal 40 as a waveform along the time axis.

The generation unit 232 combines the waveform obtained by integrating the information indicated by the waveform 314, the waveform 324 and the waveform 334 with the overall volume, thereby generating the haptic signal indicated by a waveform 340. The example of FIG. 16 schematically illustrates the amplitude (output value) and the frequency included in the haptic signal using a waveform 340.

With the above processing, the generation unit 232 can generate a haptic signal from the intermediate representation signal 40. Here, the generation unit 232 can further use device information and various types of information to generate a haptic signal with higher reproducibility. Extension examples like this will be described with reference to FIGS. 17 to 25.

Figure 17:
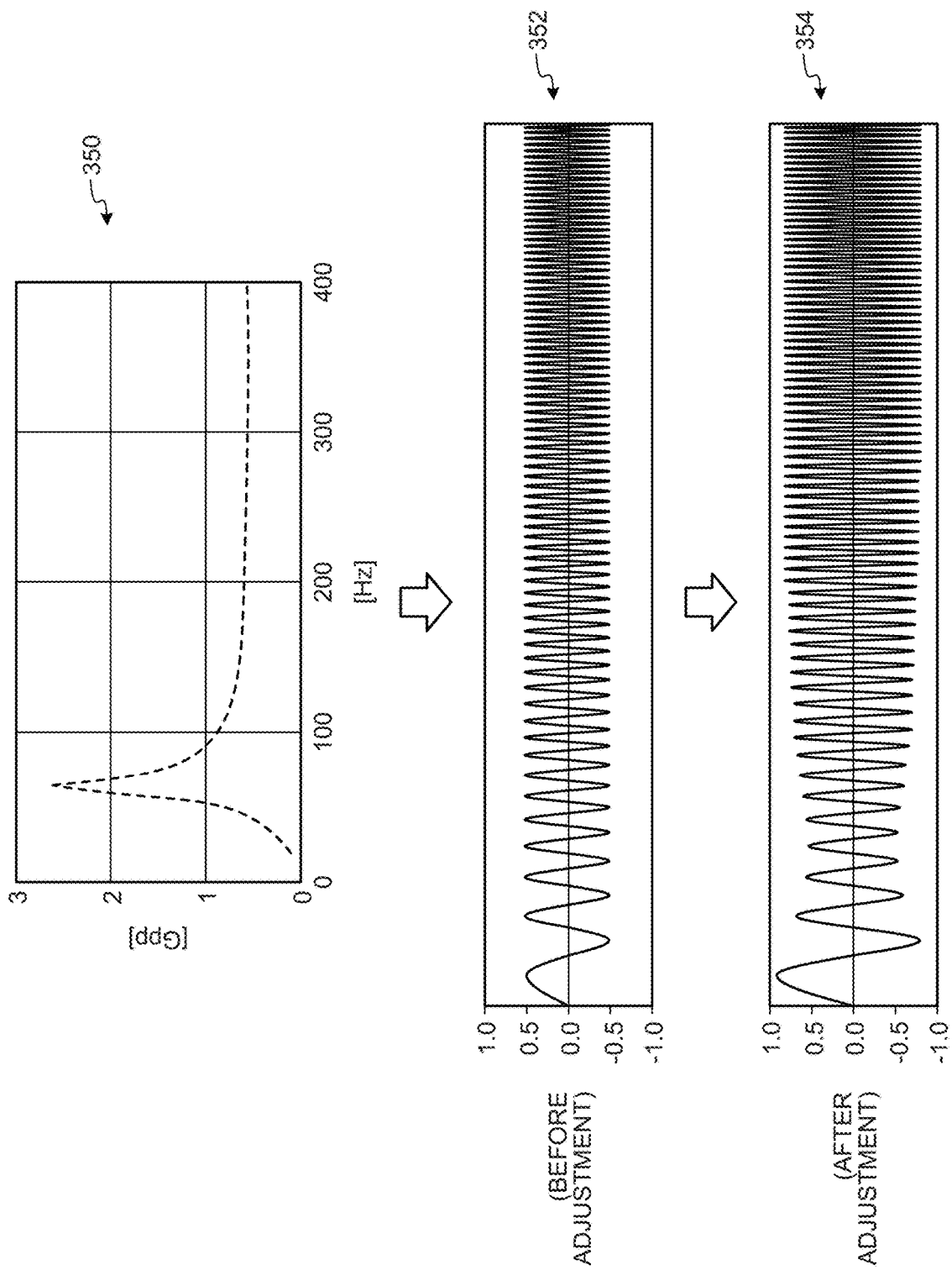
FIG. 17 is a diagram (1) illustrating an example of adjustment processing based on characteristics of a haptic presentation device.

FIG. 17 is a diagram (1) illustrating an example of adjustment processing based on characteristics of the haptic presentation device 10. Graph 350 illustrated in FIG. 17 illustrates frequency characteristics in a specific haptic presentation device 10. The example illustrated in graph 350 indicates that the haptic presentation device 10 has a distinctive peak around 70 Hz. In a case where data possessed by a manufacturer or the like of the actuator can be acquired in advance as characteristic information, the acquisition unit 231 acquires such data. When there is no data indicating characteristic information, the acquisition unit 231 may acquire the characteristic information of the haptic presentation device 10 by emitting a predetermined test signal or the like and observing a result (reaction) of the test signal or the like.

The generation unit 232 can perform predetermined adjustment processing with reference to the characteristic information such as graph 350 acquired by the acquisition unit 231. A waveform 352 illustrated in FIG. 17 schematically illustrates a waveform of a haptic signal before adjustment. The vertical axes of the waveform 352 and a waveform 354 indicate amplitude, and the horizontal axes indicate frequency. As illustrated in the waveform 352, the signal before the adjustment is uniform regardless of the frequency.

With reference to the characteristic information illustrated in graph 350, the generation unit 232 adjusts the waveform 352 into a waveform 354. The waveform 354 illustrated in FIG. 17 schematically illustrates a waveform of the haptic signal after adjustment by the generation unit 232. As illustrated in the waveform 354, in the signal after the adjustment, the amplitude around 70 Hz having the peak in graph 350 is smaller than the amplitude of the waveform 352, and the amplitudes of the other frequency bands are larger than the amplitude of the waveform 352.

In this manner, the generation unit 232 adjusts the output value for each frequency in the decoded signal based on the frequency characteristic of the output unit acquired as the characteristic information, and thereby generates a haptic signal. That is, the generation unit 232 adjusts the output of the haptic signal such that the actual output value becomes substantially constant, for example, based on information indicating specific frequency characteristics of the haptic presentation device 10. In other words, as post-processing of decoding, the generation unit 232 corrects the haptic signal so as to decrease the output at a frequency at which vibration is likely to occur and increase the output at a frequency at which vibration is less likely to occur as characteristics of the device. With this operation, the generation unit 232 can realize the output as intended by the original intermediate representation signal regardless of the characteristics of the device or the actuator.

Note that the characteristic information also include information indicating a difference not only in frequency but also in response to time (for example, a time interval from application of a voltage to occurrence of vibration). The generation unit 232 can also handle such characteristic information by adjusting the haptic signal.

FIG. 18 is a diagram (2) illustrating an example of adjustment processing based on characteristics of the haptic presentation device 10. Graph 360 indicates time response characteristics for a particular haptic presentation device 10. Specifically, graph 360 indicates the time needed for the amplitude to reach an intended output value after application of voltage, and the time needed for the amplitude to reach 0 after the voltage is turned off. Although not illustrated in FIG. 18, the time response characteristic varies depending on the frequency. In this example, the haptic presentation device 10 corresponding to graph 360 is supposed to have characteristics of quick response at 200 Hz and slow response at 50 Hz. As a typical tendency, the closer the frequency to the resonance frequency of the vibrator, the slower the time response of the vibrator.

A waveform 362 illustrated in FIG. 18 schematically illustrates a signal input to the haptic presentation device 10 illustrated in graph 360. The waveform 362 includes an attack 364 and an attack 368 representing amplitudes that vibrate the haptic presentation device 10 (for convenience, referred to as an attack). In this example, the attack 364 has a frequency (indicating the number of vibrations) of 200 Hz, and the attack 368 has a frequency of 50 Hz.

With no particular adjustment performed, as illustrated in the lower part of the waveform 362, the amplitude corresponding to the attack 364 and the amplitude corresponding to the attack 368 lead to haptic signals as illustrated.

Here, the generation unit 232 performs predetermined adjustment processing. A waveform 372 represents a signal after the waveform 362 has been adjusted by the generation unit 232. For example, the generation unit 232 adjusts the rise and attenuation timings of the decoded signal.

Specifically, the generation unit 232 shifts the amplitude of the attack 364 corresponding to the frequency at which the response is quick to a slightly earlier time. Accordingly, as illustrated in FIG. 18, an amplitude 374 in the waveform 372 will be a waveform in which the amplitude becomes 0 earlier than an end time point 366 of the attack 364. In addition, the generation unit 232 shifts the amplitude of the attack 368 corresponding to the frequency at which the response is slow to a slightly later time. Accordingly, as illustrated in FIG. 18, an amplitude 376 in the waveform 372 will be a waveform in which the amplitude becomes 0 later than an end time point 370 of the attack 368. These operations make it possible for the generation unit 232 to perform output adapted to the perception in accordance with the characteristics of the haptic presentation device 10.

Figure 19:
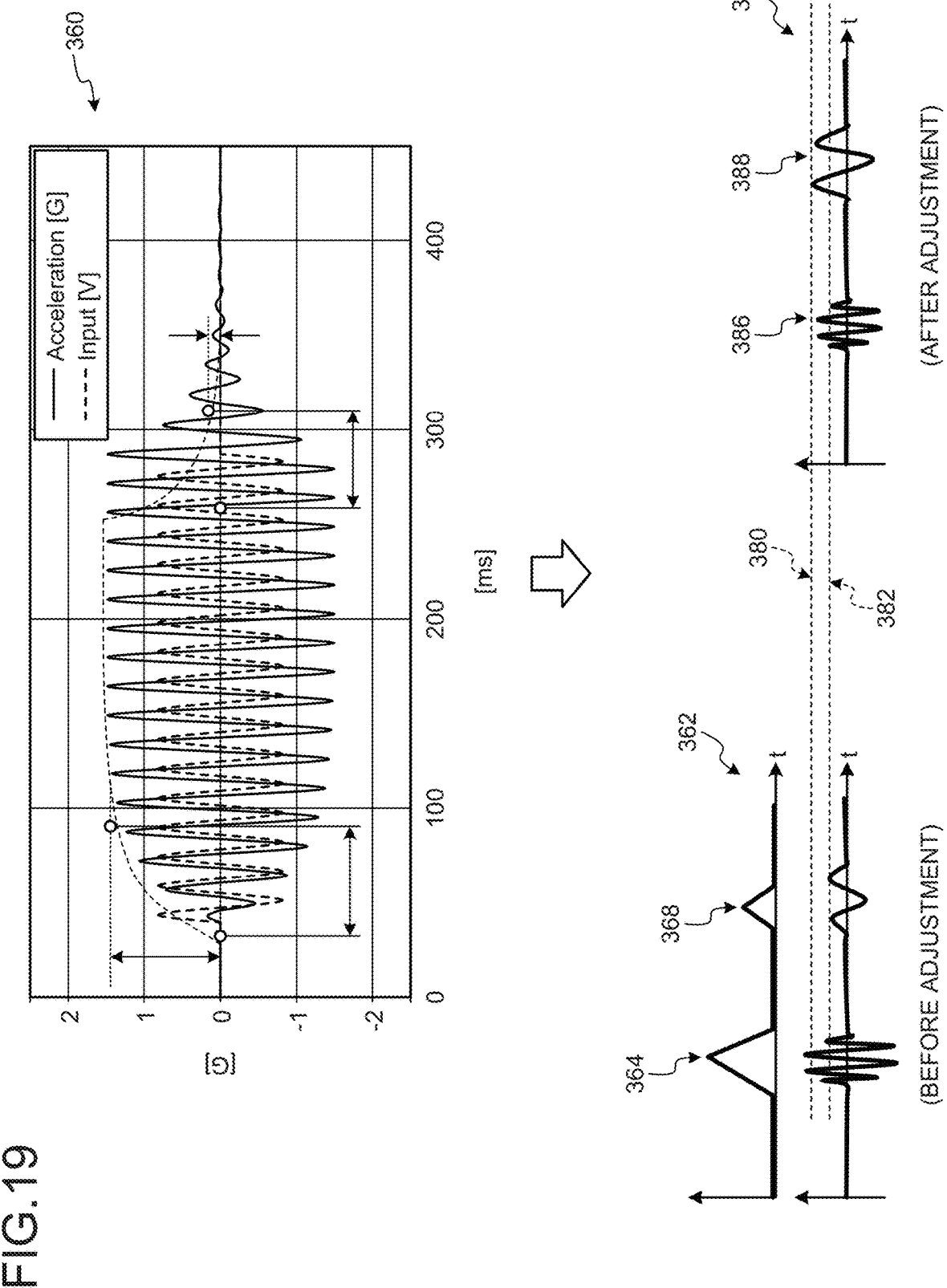
FIG. 19 is a diagram (3) illustrating an example of adjustment processing based on characteristics of a haptic presentation device.

In addition to the adjustment regarding time, the generation unit 232 may also adjust the magnitude of the amplitude (that is, the input voltage to the haptic presentation device 10). An example of this will be described with reference to FIG. 19. FIG. 19 is a diagram (3) illustrating an example of adjustment processing based on characteristics of the haptic presentation device 10.

FIG. 19 illustrates graph 360 and the waveform 362 again. Here, the generation unit 232 adjusts the amplitude of the waveform 362 and thereby generates a haptic signal for performing output adapted to human perception. For example, by slightly suppressing the magnitude of the amplitude for a frequency with a high response speed, the generation unit 232 can reproduce an output adapted to human perception. In addition, by slightly increasing the magnitude of the amplitude for a frequency with a low response speed, the generation unit 232 can reproduce an output adapted to human perception.

A waveform 384 indicates a waveform corresponding to the haptic signal adjusted by the generation unit 232. That is, the generation unit 232 slightly attenuates the input voltage for the attack 364 corresponding to the frequency at which the response is quick. In the example of FIG. 19, the generation unit 232 attenuates an output value 380 corresponding to the attack 364. Accordingly, an amplitude 386 corresponding to the attack 364 has a slightly lower output value as compared with the waveform 362. In addition, the generation unit 232 slightly amplifies the input voltage for the attack 368 corresponding to the frequency at which the response is slow. In the example of FIG. 19, the generation unit 232 amplifies an output value 382 corresponding to the attack 368. Accordingly, an amplitude 388 corresponding to the attack 368 has a slightly increased output value as compared with the waveform 362.

In this manner, the generation unit 232 adjusts the output timing or the output value of the decoded signal based on the time response characteristic of the output unit acquired as the characteristic information, and thereby generates the haptic signal. This makes it possible for the generation unit 232 to realize the ideal output possessed by the original intermediate representation signal, corresponding to the time response characteristic of the haptic presentation device 10.

Incidentally, for a signal corresponding to a frequency with a slow time response, the generation unit 232 may perform adjustment processing of inputting a signal with an opposite phase in order to converge vibration early. With this configuration, the generation unit 232 can suppress the vibration, making it possible to control the output in the haptic presentation device 10 having a slow time response to an ideal time.

Meanwhile, in a case where the conversion source signal is accompanied by a steep frequency change, it is conceivable to use a method of retaining information in the intermediate representation signal itself in encoding processing instead of decoding processing so that the change can be reproduced by haptic representation.

Figure 20:
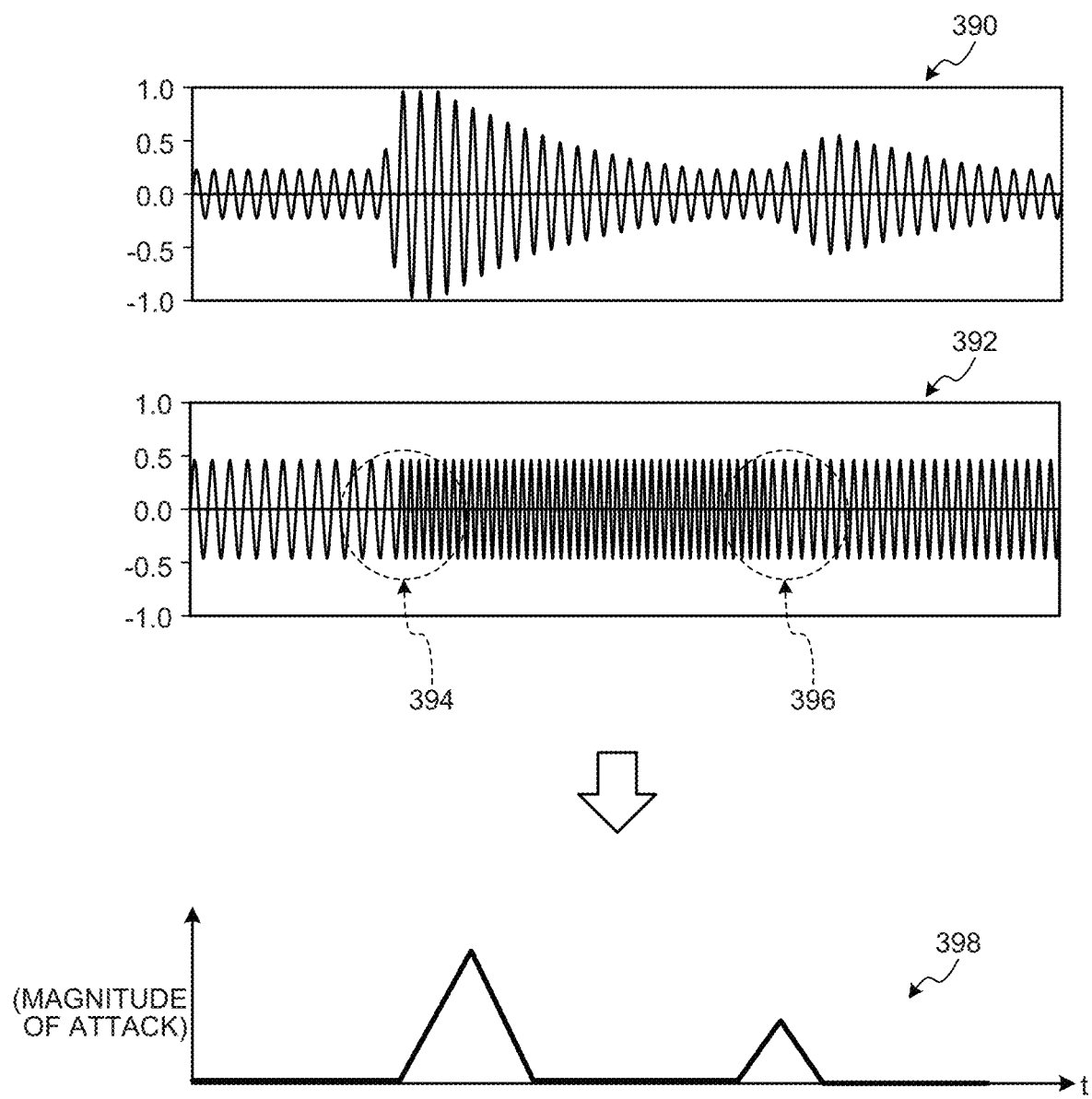
FIG. 20 is a diagram illustrating an extension example of the conversion processing according to the embodiment.

An example of this will be described with reference to FIG. 20. FIG. 20 is a diagram illustrating an extension example of the conversion processing according to the embodiment. The processing illustrated in FIG. 20 is executed by the conversion unit 132 of the conversion device 100, for example.

A waveform 390 illustrated in FIG. 20 indicates a conversion source signal with the recording of magnitude of amplitude. In this case, by expressing the magnitude of amplitude using the conversion processing described above, information regarding the intermediate representation signal can be retained as the attack parameter. On the other hand, a waveform 392 indicates a conversion source signal with no recording of the magnitude of amplitude but with the recording of a steep frequency change at time 394 or time 396. In this case, there is a possibility that the attack parameter is not to be recorded in the conversion processing described above. Still, since a steep frequency change has a great impact on human perception, it is desirable to reproduce the frequency change as a haptic representation.

Accordingly, with a steep frequency change in the conversion source signal, for example, in a case where the fundamental frequency greatly changes in a very short time frame, the conversion device 100 may record the change as the attack parameter. A waveform 398 schematically illustrates information obtained by converting the waveform 390 or the waveform 392 into an intermediate representation signal.

In this manner, the conversion unit 132 of the conversion device 100 may extract, as an attack, a section in which a change in frequency exceeding a predetermined reference occurs in a predetermined time width in the frequency change in each time unit in the conversion source signal. This enables the conversion device 100 to incorporate a steep frequency change as an attack parameter into the intermediate representation signal, making it possible to generate the intermediate representation signal including a larger variety of haptic representations.

Figure 21:
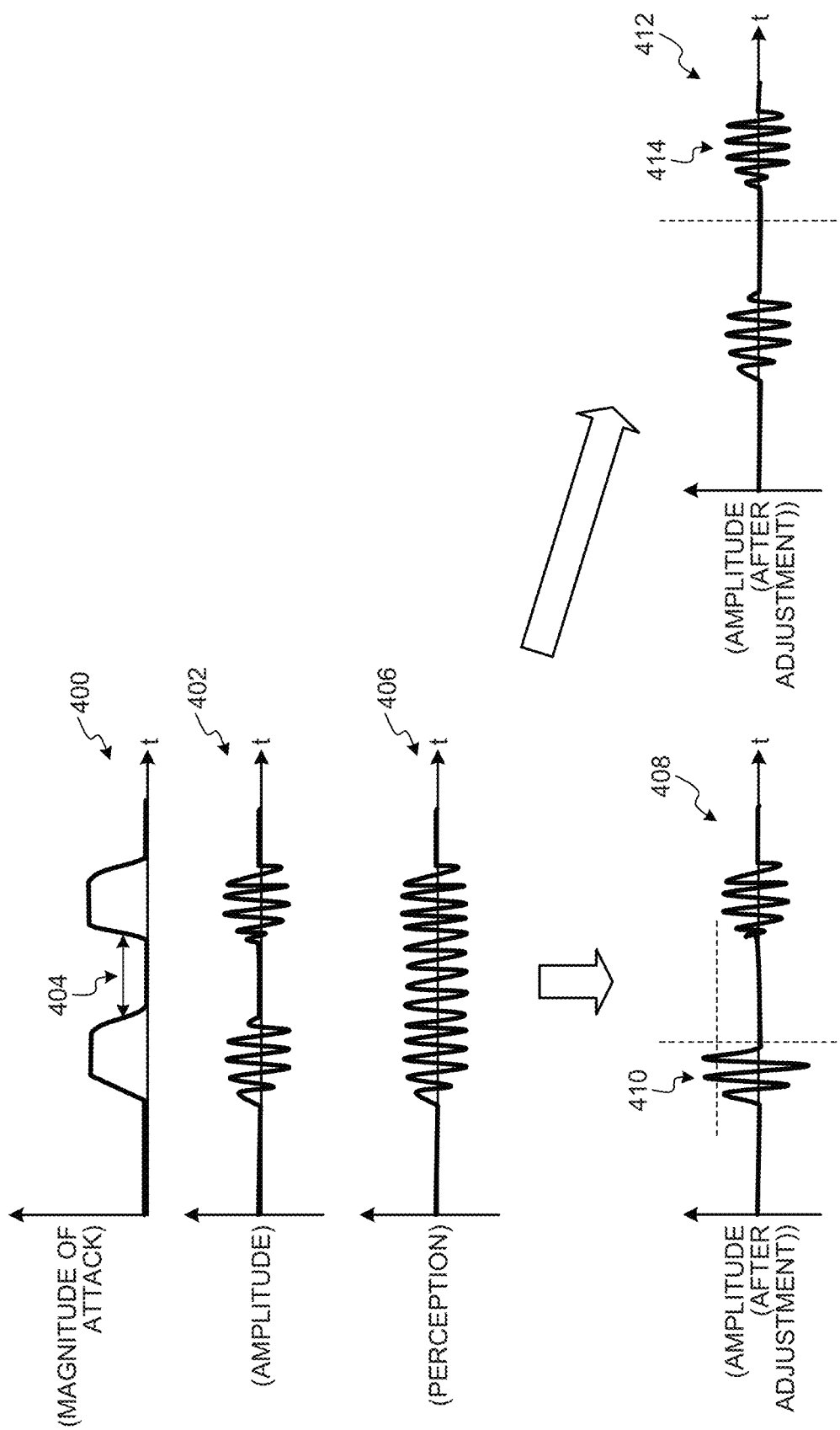
FIG. 21 is a diagram illustrating an example of adjustment processing according to a temporal change.

Next, adjustment processing in a case where attacks continue in the intermediate representation signal will be described. FIG. 21 is a diagram illustrating an example of adjustment processing according to a temporal change.

In human perception, a time interval at which two sounds can be recognized as different sounds is empirically known. A waveform 400 in FIG. 21 schematically illustrates a signal including two attacks. In this case, the haptic signal is indicated by a waveform having two amplitude peaks as indicated by a waveform 402. However, when a time interval 404 between the two attacks is less than a predetermined time (about 50 ms), there is a possibility that a human recognizes these two sounds as one sound. A waveform 406 schematically illustrates human perception of detecting a haptic signal indicated by the waveform 400 and the waveform 402 as an output.

In this case, the haptic representation originally intended to present two attacks might be impaired. To handle this, the generation unit 232 performs predetermined adjustment processing.

For example, when the decoding has generated a haptic signal as indicated by waveform 402, the generation unit 232 adjusts the haptic signal so as to shift forward an attack 410 of the two attacks to a slightly earlier time as indicated by a waveform 408. In this manner, by separating the two attacks with a time interval (for example, 50 ms or more) by which humans can perceive different sounds, the generation unit 232 performs adjustment so as not to combine the two attacks into one attack. The generation unit 232 may perform adjustment of the attack 410 not only by shifting the attack to an earlier time but also by slightly increasing the amplitude of the attack. This also enables the generation unit 232 to increase the perception sensitivity of the attack to a human.

Furthermore, as another adjustment example, the generation unit 232 may adjust the haptic signal so as to shift an attack 414, being a latter attack of the two attacks, slightly to a later time as illustrated in a waveform 412.

As described above, the generation unit 232 adjusts the signal obtained by decoding the intermediate representation signal, based on the parameter present based on the perception sensitivity of a human to which the haptic presentation is to be output by the output unit, and thereby generates a haptic signal. Specifically, the generation unit 232 adjusts the decoded signal based on a parameter set in advance based on human perception sensitivity to which haptic presentation is output by the output unit.

As an example, in a case where the generation unit 232 has decoded a signal (such as the waveform 400 illustrated in FIG. 21) including a plurality of output sections that have been intended to be isolated and output in the intermediate representation signal, and in a case where the time interval between the plurality of output sections is within a predetermined time (for example, 50 ms) set as a parameter, the generation unit adjusts to widen the time interval between the plurality of output sections, and generates a haptic signal. Alternatively, the generation unit 232 may perform adjustment to increase one of the output values corresponding to the plurality of output sections or perform adjustment to extend one of output time lengths corresponding to the plurality of output sections.

Figure 22:
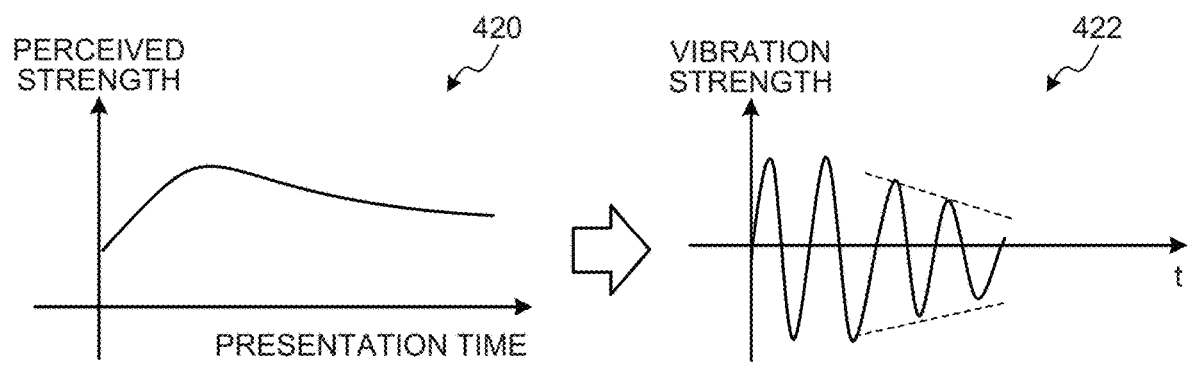
FIG. 22 is a diagram (1) illustrating an example of adjustment processing adapted to human perception.

Next, another example of processing of adjusting a haptic signal according to human perception will be described. FIG. 22 is a diagram (1) illustrating an example of adjustment processing adapted to human perception.

Graph 420 schematically illustrates a perceived strength by human in a situation where haptic signals of the same frequency are output from a haptic presentation device 10. As illustrated in graph 420, when a human senses a certain haptic signal, the human has a strong perception of the signal immediately after sensing the signal, but when the signal continues beyond a certain presentation time (for example, 1 second), the sensitivity for the signal weakens. Therefore, the generation unit 232 adjusts the vibration strength according to the perception characteristics so that the perceived strength by human is achieved as intended. For example, as illustrated in graph 422, the generation unit 232 may adjust the amplitude of the haptic signal to gradually attenuate.

In this manner, in a case where a certain frequency and an output value are output in the decoded signal beyond a predetermined time (for example, 1 second) set by parameters, the generation unit 232 may perform adjustment to change the frequency or the output value according to time.

In addition to the above example, the generation unit 232 may generate a haptic signal by adjusting the frequency or the output value of the decoded signal based on information related to the human physical part to which the haptic presentation is to be output by the output unit as one type of the characteristic information of the device. For example, the sensitivity varies depending on the output destination of the haptic signal, indicated by a fact that the human fingertip has high sensitivity to a sound of about 200 Hz, the generation unit 232 may appropriately adjust the haptic signal according to the sensitivity. In this case, by retaining in advance data or the like related to human frequency characteristics corresponding to each physical part, and applying the retained information as a parameter, the generation unit 232 can perform adjustment adapted to each physical part.

Figure 23:
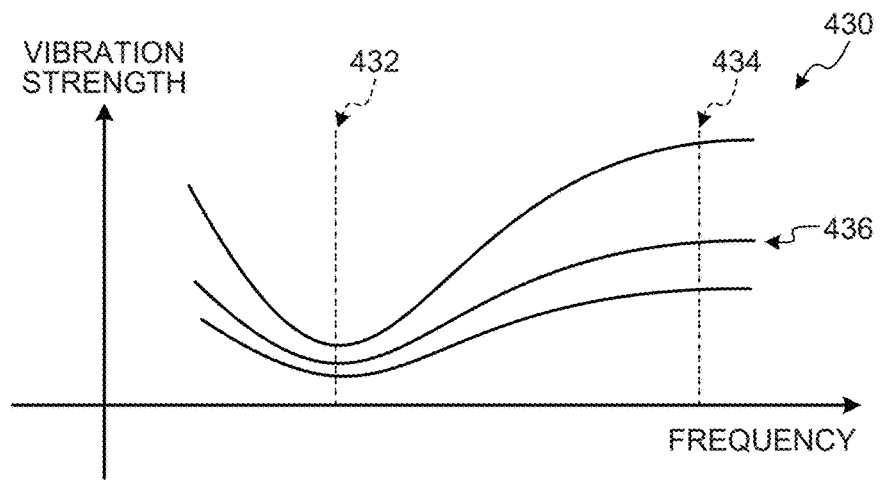
FIG. 23 is a diagram (2) illustrating an example of adjustment processing adapted to human perception.

Next, another example of processing of adjusting a haptic signal according to human perception will be described. FIG. 23 is a diagram (2) illustrating an example of adjustment processing adapted to human perception.

Frequencies include a frequency highly perceivable for humans and a frequency not highly perceivable for humans. Therefore, the generation unit 232 may shorten the output time length of the signal or decrease the amplitude of the signal corresponding to highly perceivable frequencies. That is, the generation unit 232 may adjust the signal decoded based on a preset parameter based on the human perception sensitivity related to the frequency among the human perception characteristics.

Graph 430 illustrates an example of the relationship between the frequency and the vibration strength. For example, a frequency band 432 in graph 430 is supposed to include a frequency highly perceivable for humans. In this case, as illustrated in the adjustment processing 436, the generation unit 232 decreases the vibration strength of the signal corresponding to the frequency band 432. On the other hand, a frequency band 434 in graph 430 is supposed to include a frequency not highly perceivable for humans. In this case, as illustrated in the adjustment processing 436, the generation unit 232 amplifies the vibration strength corresponding to the frequency band 434. This makes it possible for the generation unit 232 to more appropriately realize the haptic representation intended by the creator 20 and the like.

Figure 24:
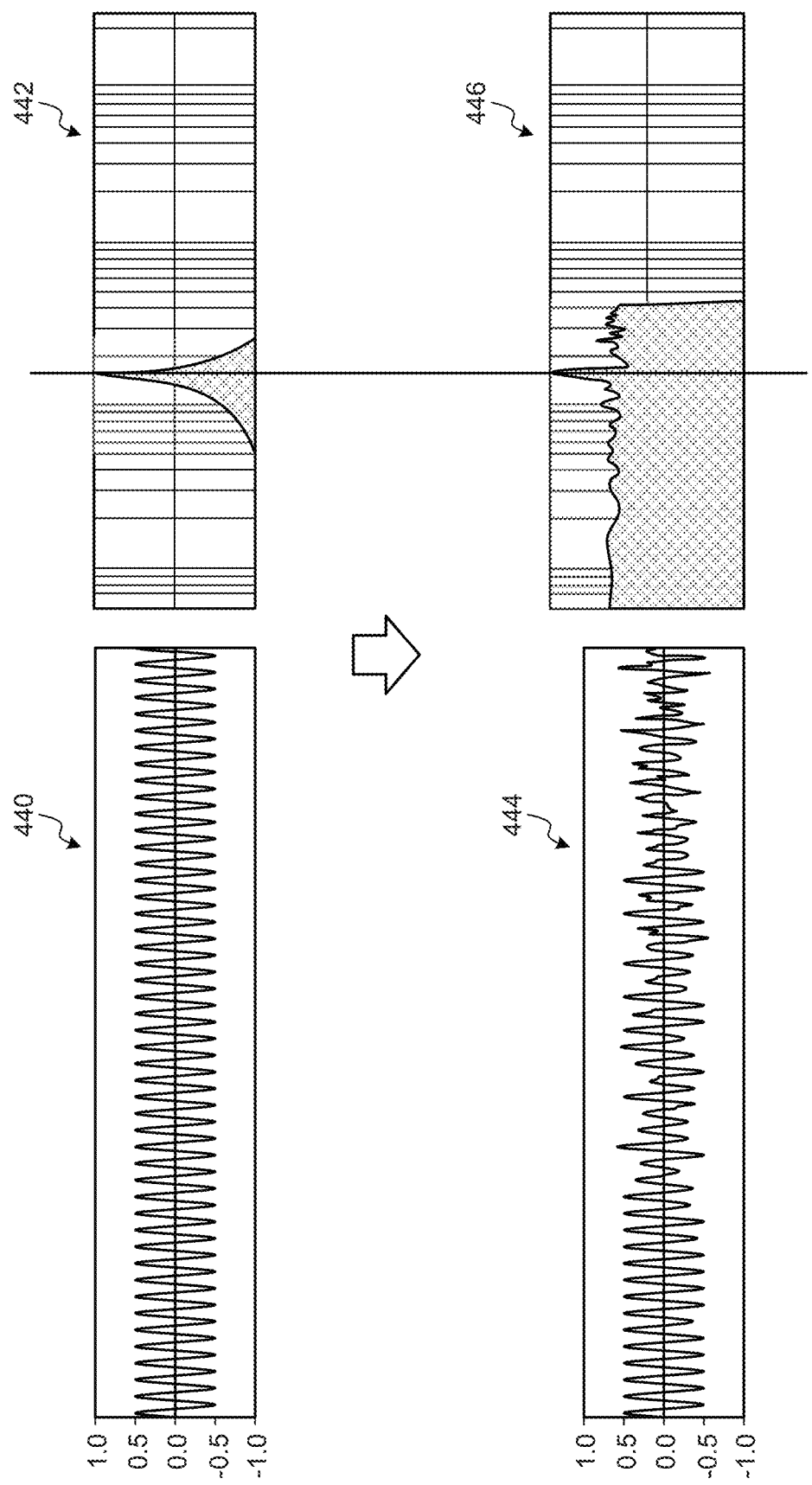
FIG. 24 is a diagram (3) illustrating an example of adjustment processing adapted to human perception.

Next, another example of processing of adjusting a haptic signal according to human perception will be described. FIG. 24 is a diagram (3) illustrating an example of adjustment processing adapted to human perception.

It is empirically known that humans tend to have a negative feeling as perception when presentation of signals of similar frequencies continues for a certain length of time. Therefore, in a case where a haptic signal includes presentation of a signal having a similar frequency, the generation unit 232 may perform adjustment to mix a noise component into the signal. A waveform 440 in FIG. 24 illustrates an example including continuous presentation of signals having similar frequencies. The signal of the waveform 440 is a signal having a fundamental frequency as illustrated in graph 442 (the horizontal axis of graph 442 represents frequency, and the vertical axis represents amplitude).

When such a signal is observed, the generation unit 232 mixes a noise component at the time of decoding to make an adjustment so as to not to allow a signal having a similar frequency to continue. A waveform 444 in FIG. 24 schematically illustrates a signal after adjustment by the generation unit 232. In addition, graph 446 illustrates the frequency of the signal after adjustment. In this case, by superimposing the noise component while avoiding changes in the fundamental frequency of the original signal, the generation unit 232 can adjust the signal to a signal that induces no negative feeling in humans without changing the fundamental features of the signal.

Figure 25:
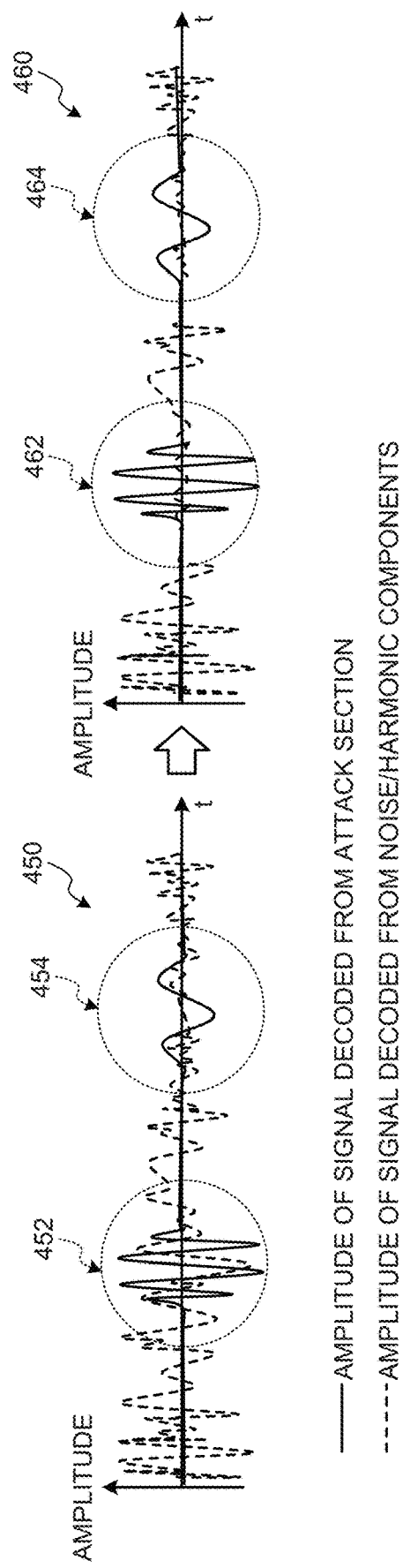
FIG. 25 is a diagram illustrating an example of adjustment processing related to signal superimposition.

Next, another example of adjustment will be described with reference to FIG. 25. FIG. 25 is a diagram illustrating an example of adjustment processing related to signal superimposition.

A waveform 450 illustrated in FIG. 25 illustrates an example in which a signal decoded from the attack parameter and a signal decoded from the noise component or the harmonic component are superimposed. In a section 452 and a section 454 of the waveform 450, signals are superimposed with similar amplitudes.

Here, a haptic signal is considered to have a dramatic sensation and have an increased effect of haptic presentation when the element of attack is clearly output. Accordingly, the generation unit 232 may refer to the haptic signal, particularly the section including an attack, and in a case where a signal other than the attack overlaps with a range including before and after the section of the attack (for example, within 50 ms), and may perform adjustment such as decreasing signal amplitude before and after the attack signal in order to emphasize the attack signal. Furthermore, in a case where the attack section continues a plurality of times as in the waveform 450, the generation unit 232 may silence the signal superimposed with the attack located earlier. This makes it possible for the generation unit 232 to more effectively perform haptic presentation corresponding to an attack.

A waveform 460 in FIG. 25 indicates a signal after adjustment by the generation unit 232. In the example in FIG. 25, the generation unit 232 removes noise and a harmonic component other than the attack in the section 462, that is, performs adjustment so as to highlight only a signal corresponding to the attack. In addition, the generation unit 232 also reduces noise and a harmonic component in the section 464, that is, performs adjustment so as to highlight only the signal corresponding to the attack. In this manner, in a case where the information decoded from the attack and the information decoded from the parameters other than the attack interfere with each other, the generation unit 232 may perform adjustment to attenuate the output value decoded from the parameters other than the attack.

An example of adjustment processing according to the embodiment has been described as above. Note that the above-described adjustment processing may be applied entirely or selectively at the time of decoding.

Description will be continued by returning to FIG. 10. The output control unit 233 outputs the haptic signal generated by the generation unit 232 to the haptic presentation device 10. Specifically, the output control unit 233 transmits the haptic signal to the haptic presentation device 10 via the network, and controls to output the haptic presentation on the haptic presentation device 10.

(1-5. Procedure of Decoding Processing According to Embodiment)

Figure 26:
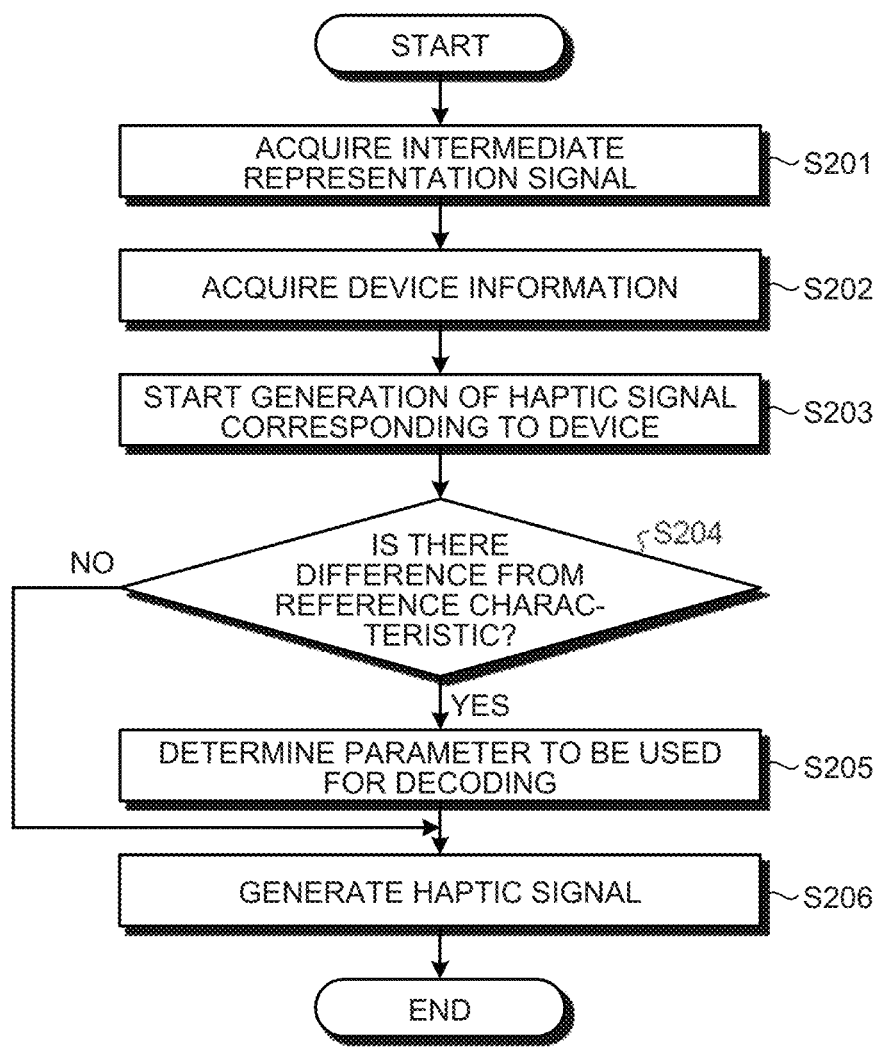
FIG. 26 is a flowchart illustrating a procedure of decoding processing according to the embodiment.

FIG. 26 illustrates a flow of conversion processing according to the embodiment. FIG. 26 is a flowchart illustrating a procedure of decoding processing according to the embodiment.

First, the decoding device 200 acquires an intermediate representation signal represented by a parameter having a high abstraction level adapted to human perception (step S201). Subsequently, the decoding device 200 acquires device information including frequency characteristics and the like of the haptic presentation device 10 (step S202).

Subsequently, the decoding device 200 starts generating a haptic signal corresponding to a device to which the haptic signal is to be output (step S203). At this time, the decoding device 200 determines whether there is a difference from the reference characteristic in the device to which the haptic signal is to be output (step S204).

The decoding device 200 refers to device information and when determining that there is a certain difference in the characteristics (step S204; Yes), the decoding device 200 determines a parameter to be used for decoding in accordance with the characteristics (step S205). The parameters in this case are not limited to amplitude, frequency, or the like, and also include adjustment parameters (value indicating degree of increase/decrease of the amplitude, the degree of shift of time, etc.) in the above-described adjustment processing.

After the parameter used for decoding is determined, or when there is no difference from the reference in the characteristic (step S204; No), the decoding device 200 generates a haptic signal (step S206). Thereafter, the decoding device 200 may output the haptic signal to the haptic presentation device 10 or may retain the haptic signal in the storage unit 220.

2. Modification of Embodiment

The information processing according to the embodiment described above may include various modifications. A modification of the embodiment will be described below.

(2-1. Device Configuration)

Figure 27:
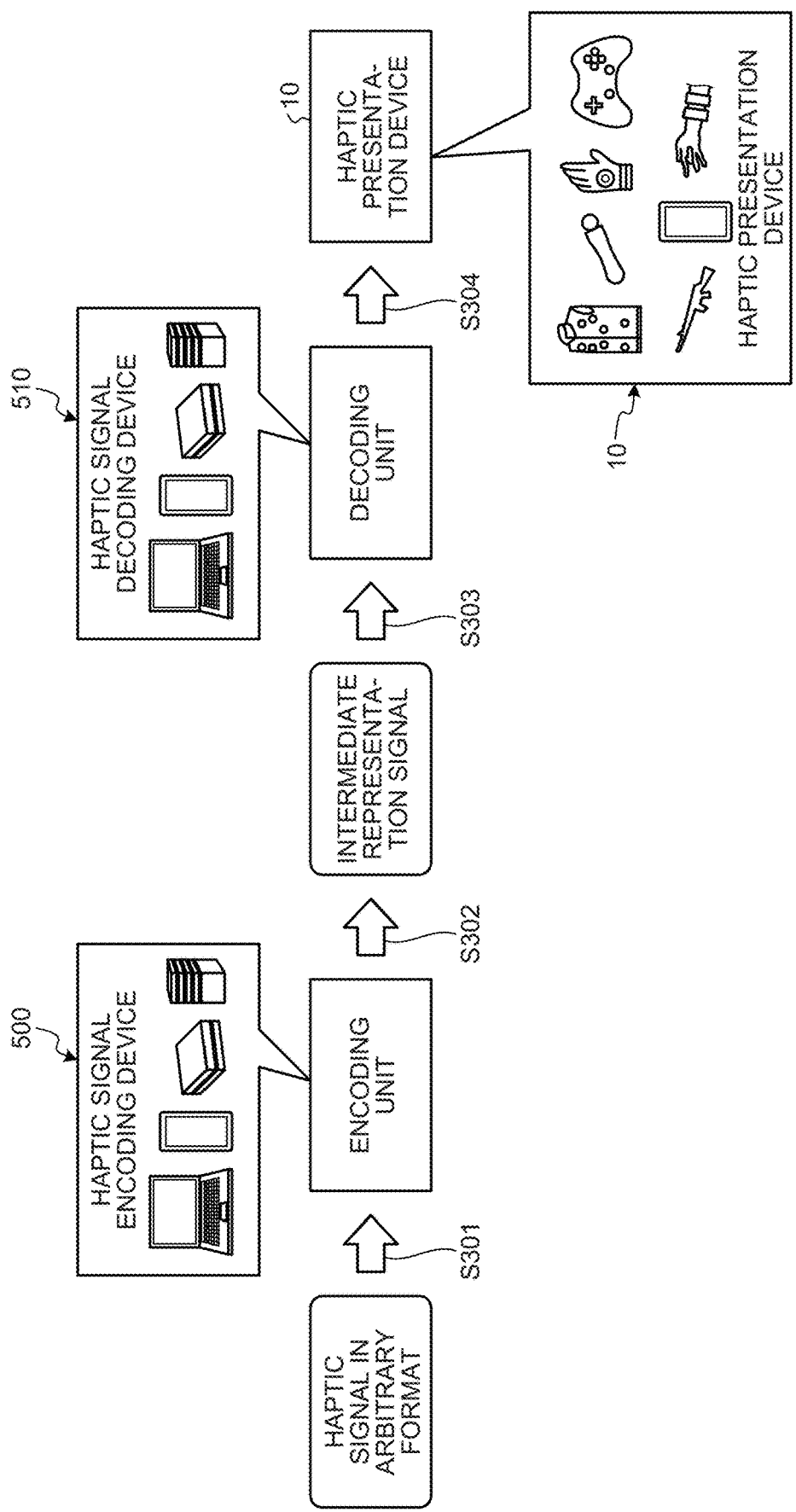
FIG. 27 is a diagram illustrating a flow of haptic presentation processing according to a modification.

The conversion device 100 and the decoding device 200 described above are not necessarily independent devices, and may be provided as a processing unit in existing haptic presentation processing. In this case, the processing units corresponding to the conversion device 100 and the decoding device 200 are incorporated in existing haptic presentation processing. This point will be described with reference to FIG. 27. FIG. 27 is a diagram illustrating a flow of haptic presentation processing according to a modification.

The example illustrated in FIG. 27 includes a flow of outputting a haptic signal in an existing format in haptic presentation processing to the haptic presentation device 10 through the conversion processing and the decoding processing according to the embodiment. In this case, the haptic signal in an existing format is acquired by a haptic signal encoding device 500 including an encoding unit that executes the conversion processing according to the embodiment (step S301). Thereafter, the encoding unit generates an intermediate representation signal by the conversion processing according to the embodiment (step S302).

Subsequently, the encoding unit transmits the intermediate representation signal to a haptic signal decoding device 510 including a decoding unit that executes the decoding processing according to the embodiment (step S303). The decoding unit generates a haptic signal from the intermediate representation signal, and outputs the generated haptic signal to the haptic presentation device 10 (step S304).

In the example of FIG. 27, the encoding unit and the decoding unit may be incorporated in the same device, or the encoding unit and the decoding unit may be incorporated in the haptic presentation device 10. That is, the conversion processing and decoding processing according to the embodiment can be incorporated as encoding processing and decoding processing in a series of haptic presentation processing regardless of the device configuration. For example, the encoding unit and the decoding unit illustrated in FIG. 27 may be provided as a plug-in that operates as software in the haptic presentation device 10.

3. Other Embodiments

The process according to each of embodiments described above may be performed in various different forms (modifications) in addition to each of embodiments described above.

Furthermore, among each processing described in the above embodiments, all or a part of the processing described as being performed automatically can be manually performed, or the processing described as being performed manually can be performed automatically by a known method. In addition, the processing procedures, specific names, and information including various data and parameters depicted in the above specifications or drawings can be changed in any manner unless otherwise specified. For example, a variety of information illustrated in each of the drawings are not limited to the information illustrated.

In addition, each of components of each device is provided as a functional and conceptional illustration and thus does not necessarily need to be physically configured as illustrated. That is, the specific form of distribution/integration of each device is not limited to those depicted in the drawings, and all or a part thereof may be functionally or physically distributed or integrated into arbitrary units according to various loads and use conditions.

Furthermore, the above-described embodiments and modifications can be appropriately combined within a range implementable without contradiction of processing.

The effects described in the present specification are merely examples, and thus, there may be other effects, not limited to the exemplified effects.

4. Effects of Conversion Device According to Present Disclosure

As described above, the conversion device (the conversion device 100 in the embodiment) according to the present disclosure includes the acquisition unit (the acquisition unit 131 in the embodiment) and the conversion unit (the conversion unit 132 in the embodiment). The acquisition unit acquires a conversion source signal to be a source of a haptic signal. The conversion unit converts the conversion source signal acquired by the acquisition unit into an intermediate representation signal represented by at least one parameter. For example, the conversion unit converts the conversion source signal into the intermediate representation signal represented by a single or a plurality of parameters corresponding to human perception.

In this manner, the conversion device converts the signal used to present haptic information into the intermediate representation signal expressed by the parameters corresponding to human perception without depending on the output environment. With this configuration, the conversion device can generate a haptic signal independent of the output environment.

Furthermore, the conversion unit separates the conversion source signal into elements constituting the conversion source signal, and converts the separated signal into an intermediate representation signal. For example, in a case where the conversion source signal is an acoustic signal in which a plurality of instrument sounds is superimposed, the conversion unit separates the acoustic signal into individual instrument sounds and converts the separated signal into the intermediate representation signal. In addition, the conversion unit separates the conversion source signal into a harmonic component being a signal having a fundamental frequency and a noise component being a signal having no fundamental frequency.

In this manner, the conversion device first separates the plurality of individual signals included in the conversion source signal and thereafter generates the intermediate representation signal, making it possible to generate the intermediate representation signal appropriately reflecting the feature of each separate signal.

Furthermore, the acquisition unit acquires, as the conversion source signal, a haptic signal including characteristic information to be applied to a specific haptic presentation device. The conversion unit converts a haptic signal including characteristic information to be applied to a specific haptic presentation device into an intermediate representation signal represented by a parameter not including characteristic information.

In this manner, the conversion device can replace an existing haptic signal with information that does not include device-dependent information, and thus does not need to transmit or process information corresponding to a large number of devices to which output is to be performed. This makes it possible for the conversion device to effectively utilize resources related to data transmission and information processing.

In addition, the conversion unit converts the conversion source signal into an intermediate representation signal including, as parameters, an attack being information representing a steep rise of an output value, a harmonic component being information having a fundamental frequency, a noise component being information not having a fundamental frequency, and information indicating a ratio between the harmonic component and the noise component.

In this manner, by expressing a signal with information such as an attack, the ratio of the noise and harmonic component, capable of performing haptic presentation adapted to human perception, the conversion device can realize haptic presentation that can further resonate with human sensitivity.

Furthermore, the conversion unit refers to a difference from a leveled value of the output value in a predetermined time width in the output value change for each time unit in the conversion source signal, and extracts a section in which the referred value exceeds a reference output value as an attack.

In this manner, the conversion device defines an attack based on the output value of the conversion source signal, making it possible to realize haptic presentation having a dramatic sensation as intended by the conversion source signal.

In addition, the conversion unit converts the conversion source signal into an intermediate representation signal including a first attack having a long output duration and a second attack having a shorter output duration as compared with the first attack. In addition, the conversion unit allocates a frequency corresponding to each attack based on the conversion source signal. For example, the conversion unit allocates the frequency corresponding to each attack based on a weighted average frequency of the signal in the section corresponding to the attack in the conversion source signal.

In this manner, by attaching length and frequency information to the attack, the conversion device can appropriately reproduce haptic presentation intended by the conversion source signal.

In addition, the conversion unit allocates a frequency corresponding to each of the harmonic component and the noise component based on the conversion source signal.

In this manner, by allowing the noise component and the harmonic component to have frequency information, the conversion device can reproduce haptic presentation that is difficult to reproduce with a simple time signal, such as a rough sensation as intended by the conversion source signal.

Furthermore, the conversion unit extracts, as an attack, a section in which a change in frequency exceeding a predetermined reference occurs in a predetermined time width in a frequency change in each time unit in the conversion source signal.

In this manner, by capturing the steep frequency change as the attack, the conversion device can appropriately replace an event expressed by the conversion source signal with haptic presentation.

5. Effects of Decoding Device According to Present Disclosure

The decoding device (decoding device 200 in the embodiment) according to the present disclosure includes the acquisition unit (acquisition unit 231 in the embodiment) and the generation unit (generation unit 232 in the embodiment). The acquisition unit acquires: an intermediate representation signal including recordings of information related to representation of haptic presentation; and characteristic information related to an output unit that performs haptic presentation based on the intermediate representation signal. The generation unit generates a haptic signal that is a signal controlling the output of the output unit based on the intermediate representation signal acquired by the acquisition unit. For example, the generation unit adjusts the signal obtained by decoding the intermediate representation signal based on the characteristic information, or decodes the intermediate representation signal after adjusting the intermediate representation signal based on the characteristic information, and thereby generates the haptic signal.

In this manner, the decoding device acquires the intermediate representation signal not including recordings of device-dependent information but including recordings of only information related to the representation of haptic presentation, and thereafter decodes the signal based on the characteristic information of the output destination. This makes it possible to perform appropriate haptic presentation to various output destinations.

The acquisition unit acquires frequency characteristic of the output unit as the characteristic information. The generation unit adjusts an output value for each frequency in the decoded signal based on the frequency characteristic, and thereby generates a haptic signal. The acquisition unit may acquire the time response characteristic of the output unit as the characteristic information. The generation unit adjusts an output timing or an output value of the decoded signal based on the time response characteristic and thereby generates a haptic signal. Furthermore, the acquisition unit may acquire, as the characteristic information, information related a human physical part to which haptic presentation is output by the output unit. The generation unit adjusts a frequency or an output value of the decoded signal based on information on a human physical part to which the haptic presentation is output by the output unit, and thereby generates a haptic signal.

In this manner, the decoding device adjusts the output value or the like based on the characteristic information of the output destination, making it possible to perform haptic presentation reflecting the creator's intention of the original signal, regardless of the mode of the output unit or the type of the haptic presentation device.

Moreover, the generation unit adjusts the signal obtained by decoding the intermediate representation signal, based on the parameters present based on the perception sensitivity of the human to which the haptic presentation is to be output by the output unit, and thereby generates a haptic signal.

In this manner, by performing adjustment adapted to human perception, the decoding device can perform more effective haptic presentation.

As an example, in a case where the generation unit has decoded a signal including a plurality of output sections that have been intended to be isolated and output in the intermediate representation signal, and in a case where the time interval between the plurality of output sections is within a predetermined time set as a parameter, the generation unit adjusts to widen the time interval between the plurality of output sections, and generates a haptic signal. The generation unit may adjust any of the output values corresponding to the plurality of output sections to be amplified and generate the haptic signal. Furthermore, the generation unit may perform adjustment so as to extend any of the output time lengths corresponding to the plurality of output sections and generate the haptic signal.

In this manner, by adjusting the output value and timing of a signal or the like that is difficult to be sensed by human perception, the decoding device can perform haptic presentation that does not submerge the creator's intention of the original signal.

In addition, in a case where a certain frequency and an output value are output in the decoded signal beyond a predetermined time set by parameters, the generation unit performs adjustment to change the frequency or the output value according to time. In addition, the generation unit adjusts the decoded signal based on a parameter that is preset based on the human perception sensitivity related to frequencies.

In this manner, in a case where a signal difficult to be sensed by a human or more likely to induce a negative feeling on a human is observed, the decoding device can generate a signal adjusted to cope with these issues, making is possible to perform haptic presentation comfortable for the human.

Moreover, the acquisition unit acquires an intermediate representation signal including, as parameters, an attack being information representing a steep rise of the output value, a harmonic component being information having a fundamental frequency, a noise component being information having no fundamental frequency, and information indicating a ratio between the harmonic component and the noise component. The generation unit decodes information related to an output value and a frequency from each of the parameters, and thereby generates a haptic signal.

In this manner, since the decoding device generates the haptic signal from the intermediate representation signal including the parameters adapted to human perception, it is possible to perform haptic presentation more intuitively.

Furthermore, in a case where the information decoded from the attack and the information decoded from the parameters other than the attack interfere with each other, the generation unit may perform adjustment to attenuate the output value decoded from the parameters other than the attack.

In this manner, by adjusting information that interferes with each other in decoding, the decoding device can perform remarkably dramatic haptic presentation of output.

6. Hardware Configuration

Figure 28:
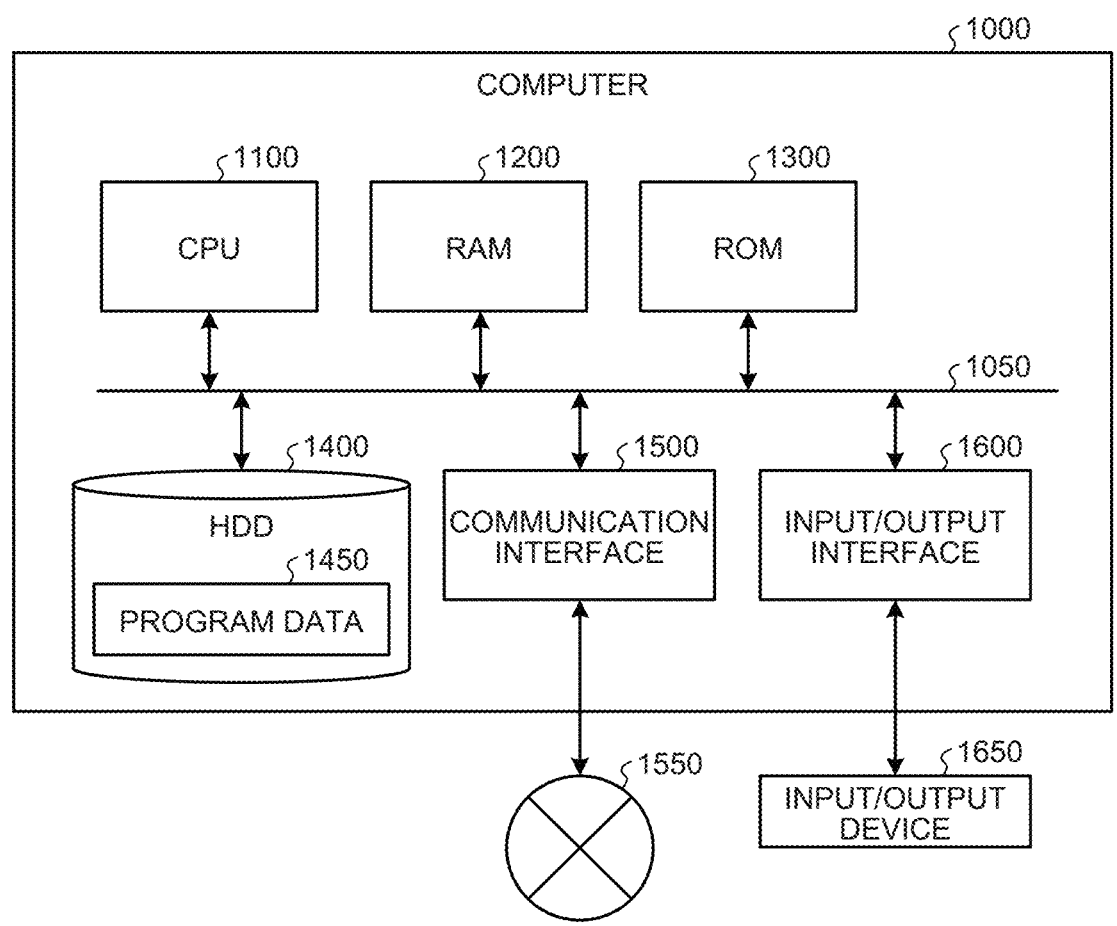
FIG. 28 is a hardware configuration diagram illustrating an example of a computer that implements functions of a conversion device.

The information device such as the conversion device 100 and the decoding device 200 according to the above-described individual embodiments are implemented by a computer 1000 having a configuration as illustrated in FIG. 28, for example. Hereinafter, the conversion device 100 according to the embodiment will be described as an example. FIG. 28 is a hardware configuration diagram illustrating an example of the computer 1000 that implements functions of the conversion device 100. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops the program stored in the ROM 1300 or the HDD 1400 into the RAM 1200 and executes processing corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting an input/output device 1650 with the computer 1000. For example, the CPU 1100 receives data from an input device such as a touch panel, a keyboard, a mouse, a microphone, or a camera via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on a predetermined recording medium. Examples of the media include optical recording media such as a digital versatile disc (DVD) or a phase change rewritable disk (PD), a magneto-optical recording medium such as a magneto-optical disk (MO), a tape medium, a magnetic recording medium, and semiconductor memory.

For example, when the computer 1000 functions as the conversion device 100 according to the embodiment, the CPU 1100 of the computer 1000 executes the information processing program loaded on the RAM 1200 so as to implement the functions of the control unit 130 or the like. In addition, the HDD 1400 stores a conversion program according to the present disclosure and data in the storage unit 120. While the CPU 1100 executes program data 1450 read from the HDD 1400, the CPU 1100 may acquire these programs from another device via the external network 1550, as another example.

Note that the present technique can also have the following configurations.

(1) A conversion device comprising:
an acquisition unit that acquires a conversion source signal to be a source of a haptic signal; and
a conversion unit that converts the conversion source signal acquired by the acquisition unit into an intermediate representation signal represented by at least one parameter.

(2) The conversion device according to (1), wherein
the conversion unit
converts the conversion source signal into the intermediate representation signal represented by the parameter corresponding to human perception.

(3) The conversion device according to (1) or (2), wherein
the conversion unit
separates the conversion source signal into elements constituting the conversion source signal, and converts the separated signal into the intermediate representation signal.

(4) The conversion device according to (3), wherein
the conversion unit,
in a case where the conversion source signal is an acoustic signal in which a plurality of instrument sounds is superimposed, separates the acoustic signal into individual instrument sounds and converts the separated signal into the intermediate representation signal.

(5) The conversion device according (3) or (4), wherein
the conversion unit
separates the conversion source signal into a harmonic component being a signal having a fundamental frequency and a noise component being a signal having no fundamental frequency.

(6) The conversion device according to any one of (1) to (5), wherein
the acquisition unit
acquires, as the conversion source signal, a haptic signal including characteristic information to be applied to a specific haptic presentation device, and
the conversion unit
converts the haptic signal including the characteristic information to be applied to the specific haptic presentation device into the intermediate representation signal represented by a parameter not including the characteristic information.

(7) The conversion device according to any one of (2) to (6), wherein
the conversion unit
converts the conversion source signal into the intermediate representation signal including, as the parameters, an attack being information representing a steep rise of an output value, a harmonic component being information having a fundamental frequency, a noise component being information not having a fundamental frequency, and information indicating a ratio between the harmonic component and the noise component.

(8) The conversion device according to (7), wherein
the conversion unit
refers to a difference from a leveled value of an output value in a predetermined time width in an output value change for each time unit in the conversion source signal, and extracts a section in which the referred value exceeds a reference output value as the attack.

(9) The conversion device according to (7) or (8), wherein
the conversion unit
converts the conversion source signal into the intermediate representation signal including a first attack having a long output duration and a second attack having a shorter output duration as compared with the first attack.

(10) The conversion device according to any one of (7) to (9), wherein
the conversion unit
allocates a frequency corresponding to each attack based on the conversion source signal.

(11) The conversion device according to (10), wherein
the conversion unit
allocates the frequency corresponding to each attack based on a weighted average frequency of the signal in the section corresponding to the attack in the conversion source signal.

(12) The conversion device according to any one of (7) to (11), wherein
the conversion unit
allocates a frequency corresponding to each of the harmonic component and the noise component based on the conversion source signal.

(13) The conversion device according to any one of (7) to (12), wherein
the conversion unit
extracts, as the attack, a section in which a change in frequency exceeding a predetermined reference occurs in a predetermined time width in the frequency change in each time unit in the conversion source signal.

(14) A conversion method comprising:
by a computer,
acquiring a conversion source signal to be a source of a haptic signal; and
converting the conversion source signal acquired into an intermediate representation signal represented by at least one parameter.

(15) A conversion program for causing a computer to function as:
an acquisition unit that acquires a conversion source signal to be a source of a haptic signal; and
a conversion unit that converts the conversion source signal acquired by the acquisition unit into an intermediate representation signal represented by at least one parameter.

REFERENCE SIGNS LIST

10 Haptic Presentation Device
100 Conversion Device
110 Communication Unit
120 Storage Unit
130 Control Unit
131 Acquisition Unit
132 Conversion Unit
133 Transmission Unit
200 Decoding Device
210 Communication Unit
220 Storage Unit
230 Control Unit
231 Acquisition Unit
232 Generation Unit
233 Output Control Unit

The invention claimed is:
1. A conversion device comprising:
an acquisition unit that acquires a conversion source signal to be a source of a haptic signal; and
a conversion unit that converts the conversion source signal acquired by the acquisition unit into an intermediate representation signal represented by at least one parameter, wherein
the conversion unit
separates the conversion source signal into elements constituting the conversion source signal, and converts the separated signal into the intermediate representation signal, and
separates the conversion source signal into a harmonic component being a signal having a fundamental frequency and a noise component being a signal having no fundamental frequency.

2. The conversion device according to claim 1, wherein
the conversion unit
converts the conversion source signal into the intermediate representation signal represented by the parameter corresponding to human perception.

3. The conversion device according to claim 1, wherein
the acquisition unit
acquires, as the conversion source signal, a haptic signal including characteristic information to be applied to a specific haptic presentation device, and
the conversion unit
converts the haptic signal including the characteristic information to be applied to the specific haptic presentation device into the intermediate representation signal represented by a parameter not including the characteristic information.

4. A conversion device comprising:
an acquisition unit that acquires a conversion source signal to be a source of a haptic signal; and
a conversion unit that converts the conversion source signal acquired by the acquisition unit into an intermediate representation signal represented by at least one parameter, wherein
the conversion unit,
separates the conversion source signal into elements constituting the conversion source signal, and converts the separated signal into the intermediate representation signal, and in a case where the conversion source signal is an acoustic signal in which a plurality of instrument sounds is superimposed, separates the acoustic signal into individual instrument sounds and converts the separated signal into the intermediate representation signal.

5. A conversion device comprising:
an acquisition unit that acquires a conversion source signal to be a source of a haptic signal; and
a conversion unit that converts the conversion source signal acquired by the acquisition unit into an intermediate representation signal represented by at least one parameter, wherein
the conversion unit
converts the conversion source signal into the intermediate representation signal represented by the parameter corresponding to human perception, and
converts the conversion source signal into the intermediate representation signal including, as the parameters, an attack being information representing a steep rise of an output value, a harmonic component being information having a fundamental frequency, a noise component being information not having a fundamental frequency, and information indicating a ratio between the harmonic component and the noise component.

6. The conversion device according to claim 5, wherein the conversion unit
refers to a difference from a leveled value of an output value in a predetermined time width in an output value change for each time unit in the conversion source signal, and extracts a section in which the referred value exceeds a reference output value as the attack.

7. The conversion device according to claim 5, wherein the conversion unit
converts the conversion source signal into the intermediate representation signal including a first attack having a long output duration and a second attack having a shorter output duration as compared with the first attack.

8. The conversion device according to claim 5, wherein the conversion unit
allocates a frequency corresponding to each attack based on the conversion source signal.

9. The conversion device according to claim 8, wherein the conversion unit
allocates the frequency corresponding to each attack based on a weighted average frequency of the signal in the section corresponding to the attack in the conversion source signal.

10. The conversion device according to claim 5, wherein the conversion unit
allocates a frequency corresponding to each of the harmonic component and the noise component based on the conversion source signal.

11. The conversion device according to claim 5, wherein the conversion unit
extracts, as the attack, a section in which a change in frequency exceeding a predetermined reference occurs in a predetermined time width in the frequency change in each time unit in the conversion source signal.

* * * * *